United States Patent [19]
Shah et al.

[11] Patent Number: 6,148,437
[45] Date of Patent: Nov. 14, 2000

[54] SYSTEM AND METHOD FOR JUMP-EVALUATED TRACE DESIGNATION

[75] Inventors: Lacky V. Shah, Sunnyvale; James S. Mattson, Jr., Campbell; William B. Buzbee, Half Moon Bay, all of Calif.

[73] Assignee: Hewlett-Packard Company, Palo Alto, Calif.

[21] Appl. No.: 09/073,197

[22] Filed: May 4, 1998

[51] Int. Cl.[7] ........................................ G06F 9/45
[52] U.S. Cl. ................................................ 717/4
[58] Field of Search ................... 395/704; 717/4

[56] References Cited

U.S. PATENT DOCUMENTS

| | | |
|---|---|---|
| 4,071,744 | 1/1978 | Pollock . |
| 4,601,008 | 7/1986 | Kato .......................... 710/260 |

(List continued on next page.)

OTHER PUBLICATIONS

Bob Cmelik & David Keppel, "Shade: A Fast Instruction–Set Simulator For Execution Profiling", Sigmetirics 94, May 1994, Santa Clara USA 1994, pp. 128–137.

(List continued on next page.)

*Primary Examiner*—Tariq R. Hafiz
*Assistant Examiner*—Wei Zhen

[57] ABSTRACT

A computer-implemented system and method are provided to designate traces of original instructions of an executable file at run time based on evaluations of control flow through jump instructions. Such designation typically increases the opportunities for dynamic optimization based on loop unrolling and other modifications of the control-flow structure of the executable file. The target of a jump instruction is designated as the start of a trace if the number of times that control has passed to it through any one or more jump instructions of a predetermined type of jump instruction reaches a predetermined start-trace threshold. The trace is ended if the number of times that control has passed through jump instructions of one of a variety of particular types of jump instructions reaches an end-trace threshold that is predetermined for each such type of jump instruction. The invention includes an instruction emulator, a start-end designator, a trace translator and optimizer, and a backpatch manager. The instruction emulator emulates original instructions that have not been translated. The start-end designator designates the start and end of traces. The trace translator and optimizer translates and optimizes traces designated by the start-end designator. The backpatch manager back-patches jump instructions in translated instructions so that they jump to target instructions that have been translated, when present.

50 Claims, 12 Drawing Sheets

U.S. PATENT DOCUMENTS

| | | |
|---|---|---|
| 5,193,180 | 3/1993 | Hastings . |
| 5,335,344 | 8/1994 | Hastings . |
| 5,355,491 | 10/1994 | Lawlor et al. . |
| 5,367,685 | 11/1994 | Gosling . |
| 5,369,766 | 11/1994 | Nakano et al. . |
| 5,381,534 | 1/1995 | Shi . |
| 5,414,855 | 5/1995 | West . |
| 5,442,790 | 8/1995 | Nosenchuk . |
| 5,452,457 | 9/1995 | Alpert et al. . |
| 5,487,158 | 1/1996 | Amelina et al. . |
| 5,504,914 | 4/1996 | Lai . |
| 5,519,866 | 5/1996 | Lawrence et al. . |
| 5,522,036 | 5/1996 | Shapiro . |
| 5,522,072 | 5/1996 | De Bruler . |
| 5,535,329 | 7/1996 | Hastings . |
| 5,548,794 | 8/1996 | Yishay et al. . |
| 5,581,697 | 12/1996 | Gramlich et al. . |
| 5,583,988 | 12/1996 | Crank et al. . |
| 5,590,331 | 12/1996 | Lewis et al. . |
| 5,606,697 | 2/1997 | Ono . |
| 5,613,118 | 3/1997 | Heisch et al. ............................ 395/709 |
| 5,625,832 | 4/1997 | Ohsawa et al. . |
| 5,627,981 | 5/1997 | Adler et al. . |
| 5,628,016 | 5/1997 | Kukol . |
| 5,652,884 | 7/1997 | Palevich . |
| 5,655,121 | 8/1997 | Delagi et al. . |
| 5,668,988 | 9/1997 | Chen et al. ............................. 395/612 |
| 5,732,210 | 3/1998 | Buzbee . |
| 5,732,272 | 3/1998 | Gochee .................................... 395/704 |
| 5,889,999 | 3/1999 | Breternitz et al. ...................... 395/709 |
| 5,909,578 | 6/1999 | Buzbee .................................... 395/704 |
| 5,915,114 | 6/1999 | McKee et al. ........................... 395/704 |

OTHER PUBLICATIONS

"Daisy: Dynamically Architected Instruction–Set From Yorktown", IBM Corporation, 1996, 2 pages.

"Digital FX!132", Digital Semiconductor, 3 pages.

Matt Pietrek, "Learn System—Level Win32 Coding Techniques By Writing A API Spy Program", Systems Journal, Dec. '94, pp. 17–44.

R. Sites, et al., "Binary Translation", Communications Of The ACM, Feb. '93, vol. 36, No. 2, pp. 69–81.

Eric Traut, "Core Building The Virtual PC", Byte, Nov. '97, pp. 51–52.

Harry J. Saal & Zui Weiss, "A Software High Performance APL Interpreter", IEIE–IEIE, vol. 9, Issue 4, 1979, pp. 74–81.

Ronald L. Johnston, "The Dynamic Incremental Compiler Of APL/3000", IEIE–IEIE, vol. 9, Issue 4, 1979, pp. 82–87.

Kemal Ebcioglu & Erik R. Altman, "DAISY: Dynamic Compilation For 100% Architectural Compatibility", IBM Research Report, RC 20538, Aug. 15, 1996, Computer Science, pp. 1–82.

Reed Hastings & Bob Joyce (Pure Software, Inc.), "Purify: Fast Detection Of Memory Leaks And Access Errors", USENIX—Winter '92, pp. 125–136.

"PA–RISC Instruction Set Architecture" processor by Hewlett–Packard Company.

Compaq—Digital Products and Services: Technical Support (visited Oct. 29, 1998) <http://www.partner,digital,com/www–swdev/pages/HOme/TECH/FX32/fx32.html>.

Sun Microsystems: "Wabi 2: Opening Windows", (visited Oct. 29, 1998) <http//www.sun.com/books/catalog/Fordin/preface.html>.

Sun Microsystems: "Shade and Spixtools", (visited Oct. 29, 1998) <httl://sw.sun.com/shade/>.

"HP Announces New PA–8000–Powered HP 3000 979KS Servers", (visited Oct. 29, 1998) <http://www.hp.com/ibp-progs/csy/advisor/nov96/news/pa8000.html >.

"Using and Developing Atom Tools", (visited Oct. 29, 1998) <http://www.unix.digital.com/faqs/p . . . HTML/AA–PS30D–TET1_html/peg10.html>.

Ebicoglu et al. Optimizations and Oracle Parallelism with Dynamic Translation. IEEE. pp. 284–295, 1999.

Le. An Out–of–Order Execution Techniques for Runtime Binary Translators. IEEE. pp. 151–158, Oct. 1998.

Mahlke et al. Compiler Synthesized Dynamic Branch Prediction. IEEE. pp. 153–164, 1996.

FIGURE 8A
Copyright (c) 1998 Hewlett-Packard Company, all rights reserved.

222 Jump Instruction Look-Up Table

| | Column A Type of Jump | Col. B Attribute | Col. C Start Threshold | Col. D Intern'l End Threshold | Col. E Ext'l End Threshold | Col. F Max Trace Length |
|---|---|---|---|---|---|---|
| 1 | unconditional forward | UF | 0 | 0 | 0 | 200 |
| 2 | unconditional backward | UB | 5 | 0 | 0 | 200 |
| 3 | unconditional in a skip shadow forward taken | USFT | 0 | 0 | 0 | 200 |
| 4 | unconditional in a skip shadow forward fall through | USFF | 0 | 0 | 0 | 200 |
| 5 | unconditional in a skip shadow backward taken | USBT | 5 | 1 | 0 | 200 |
| 6 | unconditional in a skip shadow backward fall through | USBF | 0 | 0 | 0 | 200 |
| 7 | conditional jump forward taken | CJFT | 0 | 0 | 0 | 200 |
| 8 | conditional jump forward fall through | CJFF | 0 | 0 | 0 | 200 |
| 9 | conditional jump backward taken | CJBT | 5 | 0 | 0 | 200 |
| 10 | conditional jump backward fall through | CJBF | 0 | 0 | 0 | 200 |
| 11 | conditional jump in a skip shadow forward taken | CJ-SFT | 0 | 0 | 0 | 200 |
| 12 | conditional jump in a skip shadow forward fall through | CJ-SFF | 0 | 0 | 0 | 200 |
| 13 | conditional jump in a skip shadow backward taken | CJ-SBT | 5 | 1 | 1 | 200 |
| 14 | conditional jump in a skip shadow backward fall through | CJ-SBT | 0 | 0 | 0 | 200 |
| 15 | cross space indirect jump forward | IJF | 0 | 0 | 0 | 200 |
| 16 | cross space indirect jump backward | IJB | 0 | 0 | 0 | 200 |
| 17 | cross space indirect jump in a skip shadow forward taken | IJ-SFT | 0 | 0 | 0 | 200 |
| 18 | cross space indirect jump in a skip shadow forward fall | IJ-SFF | 0 | 0 | 0 | 200 |
| 19 | cross space indirect jump in a skip shadow backward taken | IJ-SBT | 0 | 0 | 0 | 200 |
| 20 | cross space indirect jump in a skip shadow backward taken | IJ-SBF | 0 | 0 | 0 | 200 |
| 21 | indirect jump forward | IF | 0 | 0 | 0 | 200 |
| 22 | indirect jump backward | IB | 0 | 0 | 0 | 200 |

FIGURE 8B
Copyright (c) 1998 Hewlett-Packard Company, all rights reserved.

| | | | | | | |
|---|---|---|---|---|---|---|
| 23 | indirect jump in a skip shadow forward taken | ISFT | 0 | 0 | 0 | 200 |
| 24 | indirect jump in a skip shadow forward fall through | ISFF | 0 | 0 | 0 | 200 |
| 25 | indirect jump in a skip shadow backward taken | ISBT | 0 | 0 | 0 | 200 |
| 26 | indirect jump in a skip shadow backward fall through | ISBF | 0 | 0 | 0 | 200 |
| 27 | jump and link forward | CALL-F | 0 | 0 | 0 | 200 |
| 28 | jump and link backward | CALL-B | 5 | 1 | 0 | 200 |
| 29 | jump and link in a skip shadow forward taken | CALL-SFT | 0 | 0 | 0 | 200 |
| 30 | jump and link in a skip shadow forward fall through | UF | 0 | 0 | 0 | 200 |
| 31 | jump and link in a skip shadow backward taken | UF | 0 | 0 | 0 | 200 |
| 32 | jump and link in a skip shadow backward fall through | UF | 0 | 0 | 0 | 200 |
| 33 | code cache exit | UF | 5 | 1 | 1 | 200 |
| 34 | system call | SYS-CALL | 5 | 0 | 0 | 200 |

FIGURE 9

| Row or Record | Column 902<br>Hash-Table Entry for Original Instruction Address | Column 904<br>Address in Translated Instruction Storage Area 202 | Column 906<br>Start-Trace Counter for Target Instructions | Column 908<br>Jump-Type Indicator for Jump Instructions |
|---|---|---|---|---|
| | 242 Instruction Data Structure | | | |
| A | 902A | 904A | 906A | 908A |
| B | 902B | 904B | 906B | 908B |
| C | 902C | 904C | 906C | 908C |
| -- | ---- | ---- | ---- | ---- |
| N | 902N | 904N | 906N | 908N |

FIGURE 10

| 244<br>Temporary Trace<br>Control-Flow List |
|:---:|
| 1000<br>Trace Instruction<br>Counter |
| 1001<br>Starting Address of<br>Current Trace (Trace<br>Instruction #1) |
| 1002<br>Address of Trace<br>Instruction #2 |
| 1003<br>Address of Trace<br>Instruction #3 |
| - - - - |
| 1099<br>Address of Last Trace<br>Instruction |

SYSTEM AND METHOD FOR JUMP-EVALUATED TRACE DESIGNATION

RELATED APPLICATIONS

The following applications are related to the present application.

U.S. Patent Application entitled "SYSTEM, METHOD, AND PRODUCT FOR CONTROL-PATH-EVALUATED TRACE DESIGNATION," attorney docket number 10971147-1, naming as inventor Manuel E. Benitez, James S. Mattson, Jr., William B. Buzbee and Lacky V. Shah assigned to the assignee of the present invention and filed concurrently herewith.

U.S. Patent Application entitled "METHOD, APPARATUS, AND PRODUCT FOR DYNAMIC SOFTWARE CODE TRANSLATION SYSTEM," attorney docket number 10980332-1, naming as inventors James S. Mattson, Jr., William B. Buzbee, and Lacky V. Shah, assigned to the assignee of the present invention and filed concurrently herewith.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The invention generally relates to computer systems or computer-implemented systems employing translating or optimizing compilers and methods, and, more particularly, to dynamic translating compilers and methods.

2. Related Art

A variety of techniques are known for static translation of the executable instructions of a computer software program. Such known techniques are implemented by static compilers, i.e., compilers that translate a program prior to execution. One disadvantage of such techniques is that the dynamic behavior of a program typically is more readily and accurately ascertained while it is being executing than while it is being compiled prior to execution.

Some systems and methods exist that avoid this disadvantage by a process generally referred to as dynamic translation. That is, a dynamic compiler operates upon an executable image of the original software program as it is being executed at run time. Typically, the dynamic compiler is thus better able to deduce those paths that execution is most likely to take through particular portions of the program (often referred to as the control flow through the instructions of the program).

Such known dynamic translation systems may be designed to accomplish one or more of a number of tasks. One task is referred to as cross-platform translation, in which a program designed and written for execution on a computer system having a particular architecture and operating system is translated so that the translated program may be executed on another type of computer system. Some existing dynamic translation systems include "Daisy" by International Business Machine Corporation, "fx!32" from Digital Equipment Corporation, and "Wabi" from Sun Microsystems.

Dynamic translation systems are also used for instrumentation and profiling of programs without the need for recompilation. The term "instrumentation" refers generally to the insertion of special code to detect or record various parameters of execution, and "profiling" refers generally to reporting such parameters. Such use may also be referred to as "monitoring." Examples of existing products intended for such uses include "Shade" from Sun Microsystems and "ATOM" from Digital Equipment Corporation.

Such tasks of dynamic translation systems generally are also undertaken by static translation systems, albeit with the noted disadvantage. However, another task traditionally carried out by static translation systems is not adequately carried out by known dynamic translation systems. Such task is optimization; that is, the alteration, deletion, rearrangement, or other revision of instructions, or the addition of new instructions, with the specific objectives of increasing the speed of execution of executable instructions, decreasing the amount of computer resources needed for such execution, or both. Therefore, what is needed is a system and method for increasing the opportunities for dynamic optimization of executable instructions.

In particular, what is needed is a system and method for determining those particular sequences of instructions of an original executable file such that, if the instructions are translated and optimized, quicker execution, reduced resource usage, or both, will most likely be achieved. Such selectivity generally is advantageous because it is possible to spend more time translating and optimizing instructions than will be gained by such translation and optimization. For example, control may flow through a group of instructions that, for any of a variety of reasons, is not amenable to, or significantly benefited by, optimization. Accordingly, what is particularly needed is a system and method for selecting sequences of instructions, based on control flow through such instructions at run time, that are most amenable to dynamic optimization.

SUMMARY OF THE INVENTION

The present invention is a computer-implemented system, method and product for designating groups of instructions for translation at run time. In one embodiment, such designated groups of instructions are translated, and some or all translated instructions also are dynamically optimized. In particular, the present invention designates groups of instructions for translation and dynamic optimization based on their control-flow structure, as determined by control flow through jump instructions. The terms "dynamically optimized," or simply "optimized," and their grammatical variants, refer herein to the application of any of a variety of optimization techniques, now known or to be developed in the future, to instructions or groups of instructions at run time.

In one embodiment, the present invention is a jump-evaluating trace designator that includes an original instruction processor (not to be confused with a CPU), an instruction emulator, a start-end designator, a trace translator and optimizer, and a backpatch manager. The jump-evaluating trace designator designates groups of instructions, referred to as traces, for dynamic translation based on an evaluation of control flow through jump instructions (a function hereafter referred to as "jump evaluation"). The jump-evaluating trace designator also translates and optimizes such traces. A trace typically is made up of one or more basic blocks of an executable file, each of which may be reached through a common control path. A basic block typically is a sequence of instructions of an executable file such that if the first instruction is executed, all other instructions in the basic block will be executed. A basic block may also consist of a single instruction. A control path from one basic block to another basic block is referred to herein as an arc. The action of transferring control over an arc, other than by an unconditional fall-through, is referred to as a jump. An unconditional fall-through is the unconditional passing of control from a first instruction to the instruction immediately following such first instruction. An instruction that causes a jump to occur is referred to herein as a jump instruction. The instruction to which a jump is directed is referred to herein as a target instruction.

Advantageously, the designation of traces based on jump evaluation typically increases opportunities for dynamic optimization based on the unrolling of loops and other modifications of the control-flow structure of the executable file. Also advantageously, designation of traces based on jump evaluation typically reduces the amount of memory required for designating traces as compared to schemes that depend on control-flow counters and not on jump evaluation.

In one embodiment, the original instruction processor of the jump-evaluating trace designator, in cooperation with the operating system and CPU, assumes control over the execution of original instructions of an executable file. Such instructions, and associated data if any, are hereafter collectively referred to simply as "original instructions." It will be understood by those skilled in the relevant art that such original instructions may be an image, or copy, of the instructions of the executable file stored on a program storage device, described below. The original instruction processor also selectively directs control among various functional modules of the trace designator. The original instruction processor includes an execution interrupter, a machine-state preserver, and a driver.

The execution interrupter of the original instruction processor, in cooperation with the CPU and the operating system, suspends conventional execution of the original instructions by the CPU under the direction of the operating system and, instead, initiates control by the original instruction processor over instruction execution. The execution interrupter also returns control over instruction execution to the CPU under the direction of the operating system after the jump-evaluating trace designator completes or terminates its operations.

The machine-state preserver of the original instruction processor preserves the state of various machine values or conditions, such as the values of registers, status flags, or system memory locations, prior to the altering of any such values or conditions by the jump-evaluating trace designator. The machine-state preserver also reinstates such values or conditions after the jump-evaluating trace designator completes or terminates its operations. Thus, the user computer is returned to its state prior to the operation of the jump-evaluating trace designator.

The driver of the original instruction processor selectively directs control among the instruction emulator, the start-end designator, and translated and optimized instructions in a translated instruction storage area of memory. Generally, the driver directs control to the instruction emulator to simulate execution of the original instructions until an original instruction is encountered that has already been translated, or an original jump instruction is encountered. If a previously translated original instruction is encountered, the driver directs control to the corresponding translated instruction for execution. If a jump instruction is encountered, the driver directs control to the start-end designator to determine if such jump instruction indicates an appropriate start or end of a trace.

The instruction emulator of the jump-evaluating trace designator emulates original instructions that have not been translated. The instruction emulator mimics the operations that the CPU would have applied to the original instructions if the execution interrupter had not interrupted such conventional execution. That is, rather than original instructions being executed by the CPU, emulated instructions are executed by the CPU under the control of the instruction emulator. Thus, control may be passed by the instruction emulator to the driver so that the driver may selectively direct control as noted.

In one embodiment, the start-end designator of the jump-evaluating trace designator designates the start and end of traces. In one aspect of such embodiment, a target instruction is designated to be the start of a trace if the number of times that control has passed to it reaches a threshold number, referred to as the start-trace threshold. Typically, but not necessarily, the start-trace threshold is predetermined. That is, its value is established prior to run time. Such predetermined value typically is predetermined by the trace designator; for example, by the value being stored in a data array within the trace designator. Such predetermined value is accessed by the trace designator at run time. However, in alternative embodiments, a predetermined value may be set by a user, or otherwise established, prior to run time. Also, the value of the start-trace threshold may not be predetermined, or a predetermined value may be changed. That is, the start-trace value may be set or altered by the user; calculated or set by the trace designator; or otherwise re-assessed, set, adjusted, or established at run time. Similarly, the end-trace threshold, or the maximum number of original instructions in a trace, may be predetermined by the user, the trace designator, or otherwise. Also, their values may not be predetermined; that is, they may be re-assessed, set, adjusted, or otherwise altered at run time by the user, the trace designator, or otherwise. Such adjustments may be advantageous, for example, if it is observed by a user, or the trace designator determines, that the executable instructions may be more amenable to dynamic optimizations if the unrolling of a loop spans a larger number of iterations of the loop. As another example, the value of the maximum number of original instructions in a trace may be reduced if the user observes, or the trace designator determines, that too much memory or time is being spent translating and optimizing large traces. The trace designator may make such determinations by, for example, comparing the amount of memory or time so spent against values representing desirable performance. Similarly, the trace designator may compare the execution time of optimized instructions against values representing desirable performance to determine if more, or fewer, iterations should be included in the loop unrolling.

Advantageously, by typically establishing the start-trace threshold at a value greater than one, it is provided that only groups of instructions executed more frequently than once, depending on such value, are translated and optimized. Such start-trace threshold thus typically avoids counter-productive expenditures of time required to implement translation and optimization of infrequently executed instructions. That is, such selection provides that the time spent in translation and optimization typically is at least offset by the time gained through optimization. Similarly, in such embodiment, the start-end designator designates a jump instruction to be the end of the trace if the number of times that control has passed through it reaches a predetermined end-trace threshold.

In various aspects of such embodiment, the start or end of a trace, or both, are also determined by the types of jump instructions through which control passes. That is, the start-trace threshold or the end-trace threshold may each have a certain value for one type of jump instruction and may have other values for other types of jump instructions. A type of jump instruction may also be excluded from evaluation in determining the start or the end, or both, of a trace. Typically, the start-trace or end-trace threshold of such type of jump instruction is thus represented by a value or symbol, which may be non-numeric, that represents a threshold that can never be reached. Such a jump instruction is hereafter referred to as a "start-trace-ineligible" or "end-trace-ineligible" jump instruction, respectively, or both. A jump instruction that is not so excluded for either determining the start or the end of a trace is referred to hereafter as a "start-trace-eligible" or "end-trace-eligible" jump instruction, respectively, or both.

In one embodiment, a target instruction is designated as the start of a trace if the number of times that control has passed to it through any type of start-trace-eligible jump instruction reaches a start-trace threshold. Typically, such number is stored in a start-trace counter uniquely associated with that target instruction. In one aspect of such embodiment, each type of start-trace-eligible jump instruction has a corresponding start-trace threshold, and the start-trace threshold used to determine if a trace should start is the one corresponding with the type of jump instruction through which control most recently passed to the target instruction. In alternative aspects, a target instruction could have a set of start-trace counters, one counter corresponding to each type of start-trace-eligible jump instruction. In such alternative aspects, the trace is started if the target instruction's start-trace counter for the type of jump instruction through which control most recently passed to such target instruction reaches the start-trace threshold corresponding to such type of start-trace-eligible jump instruction.

Similarly, in one embodiment, an end-trace-eligible jump instruction of a particular type is designated as the end of the trace if the number of times that control has passed through jump instructions of such type reaches an end-trace threshold that corresponds to such type of jump instruction. Thus, a set of end-trace counters is provided for the trace, each counter of which corresponds to one type of end-trace-eligible jump instruction through which control has passed during execution of the trace. If such a counter reaches the end-trace threshold for the associated type of jump instruction, the trace is ended.

In some embodiments, a jump-instruction-specific maximum end-trace threshold may also be provided as an alternative indicator for ending a trace. That is, if the number of instructions in the trace has reached a value equal to or greater than the maximum end-trace threshold for the type of jump instruction most recently executed, then the trace is terminated. Advantageously, such termination occurs whether or not such jump instruction is end-trace eligible.

Advantageously, the control-flow structure of a trace generally is determined by the values of start-trace or end-trace thresholds of particular types of jump instructions. Therefore, opportunities to employ certain optimization techniques that are dependent on control-flow structure typically may be increased by appropriately predetermining, or by appropriately selecting or adjusting the start-trace or end-trace thresholds. As noted, such selection or adjustment may be effectuated by user intervention or automatically by the trace designator.

Advantageously, the jump-evaluating trace designator of the illustrated embodiment designates traces for translation and optimization based on the dynamic behavior of the executable file. That is, a trace is typically designated based on the actual course of execution rather than on an estimate made at compile time, or a projection based only on initial execution, of how the file will execute.

The trace translator and optimizer of the illustrated jump-evaluating trace designator translates and optimizes each trace designated by the start-end designator. In alternative embodiments, translated instructions may be instrumented but not optimized, or translated instructions may be both instrumented and optimized. Such instrumentation typically is provided in such alternative implementations to detect or record parameters of execution, such as control flow or memory access; to assess suitability for optimization; or to achieve other purposes. Advantageously, translated instructions enable monitoring of the dynamic behavior of the execution of an executable file through instrumentation with much less loss of speed than typically would occur by alternative techniques. For example, if the original instructions of the executable file had been emulated in order to monitor such dynamic behavior, the loss of speed would typically be many times greater than the loss of speed that typically occurs by executing translated instructions. Also advantageously, certain known optimization techniques may be applied at run time by a dynamic optimizer that generally could not be applied at compile time by a static optimizer (that is, as noted, one in which instructions are optimized prior to run time). A reason for such increased capability is that the precise control flow path is known at run time with respect to the group of instructions to be translated and optimized. Thus, for example, variables that could have a range of values depending on control flow may generally have only one possible value as a result of a known control flow. Original instructions of the executable file compiled so as to accommodate such variability may therefore be optimized by the dynamic optimizer. That is, the dynamically optimized instructions may be simplified, reduced in number, or otherwise optimized because certain possibilities associated with alternative control paths not taken may be excluded.

In one embodiment, the backpatch manager of the jump-evaluating trace designator backpatches translated jump instructions so that they pass control to target instructions that have also been translated, when present. The term "backpatch," and its grammatical variants, will be understood by those skilled in the relevant art to refer to the replacement, typically by overwriting, of one or more executable instructions by new executable instructions. Typically, the function of backpatching, as in this embodiment, is to redirect a jump instruction so that it transfers control to a new target instruction. Such new target instruction typically is the first-executed in a group of instructions that are a translated version of the instructions to which the backpatched jump instruction passed control. Optionally, as noted, such translated instructions may also be instrumented or optimized, or both.

In one aspect of this embodiment, the backpatch manager examines a trace after it has been translated to determine if any other previously translated trace has a jump instruction that jumps to the newly translated trace. If so, then such previously translated jump instruction is backpatched; that is, it is changed so that control jumps directly to the corresponding newly translated target instruction in the newly translated trace. Without such backpatching, if the previously translated trace were again to be executed, control would typically pass from the previously translated jump instruction to the driver of the original instruction processor. As noted, in one aspect of the invention, the driver would then direct control to the corresponding translated target instruction. Advantageously, backpatching eliminates the additional step of returning to the driver.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 240 appears first in FIG. 2, the element 1001 appears first in FIG. 10), solid lines generally indicate control flow, dotted lines generally indicate data flow, and wherein:

FIG. 8A, continued on FIG. 8B, is a schematic representation of one embodiment of a jump instruction look-up table of the jump-evaluating trace designator of FIG. 2;

FIG. 9 is a schematic representation of one embodiment of an instruction data structure of the jump-evaluating trace designator of FIG. 2;

FIG. 10 is a schematic representation of one embodiment of a temporary trace control-flow list of the jump-evaluating trace designator of FIG. 2.

DETAILED DESCRIPTION

Figure 1:
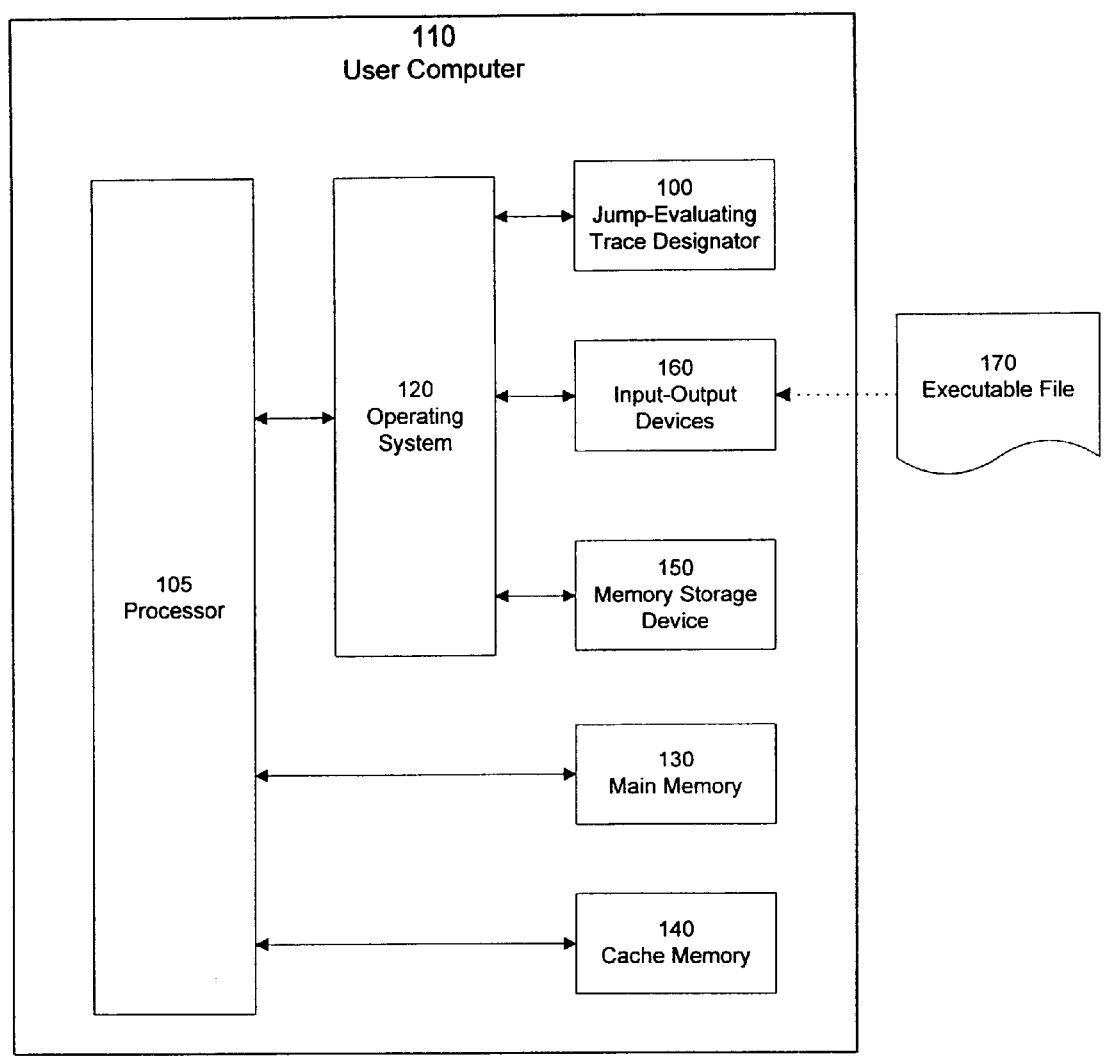
FIG. 1 is a functional block diagram of one embodiment of a computer system on which the jump-evaluating trace designator of the present invention is implemented.

The attributes of the present invention and its underlying method and architecture will now be described in greater detail with reference to one embodiment of the invention, referred to as jump-evaluating trace designator 100, or simply trace designator 100, aspects of which are illustrated in FIGS. 1 through 11. In this detailed description, references are made to various functional modules of the present invention that may be implemented either in software, hardware, firmware, or any combination thereof. For convenience of illustration, references generally are made to implementations in software. Such references therefore typically refer to software-implemented functional modules that will be understood to comprise sets of software instructions that cause described functions to be performed. Similarly, in a software implementation, trace designator 100 as a whole may be referred to as "a set of jump-evaluating-trace-designator instructions."

It will be understood by those skilled in the relevant art that the functions ascribed to trace designator 100, or any of its functional modules, typically are performed by the central processing unit (CPU) of the computer system executing such software instructions, typically in cooperation with the operating system of the computer system. More generally, it will be understood that functions performed by the invention, whether implemented in software, hardware, firmware, or any combination thereof, typically are performed by the CPU in cooperation with the operating system. Henceforth, the fact of such cooperation among the CPU, the operating system, and the modules of the invention, whether implemented in software, hardware, firmware, or any combination thereof, may therefore not be repeated or further described, but will be understood to be implied. In particular, the cooperative functions of the operating system, which are well known to those skilled in the art, may be omitted for clarity.

It will also be understood by those skilled in the relevant art that the functions ascribed to trace designator 100 and its functional modules, whether implemented in software, hardware, firmware, or any combination thereof, may in some embodiments be included in the functions of the operating system. That is, for example, operating system 120 may include trace designator 100. In such embodiments, the functions of trace designator 100 may be described with reference to the execution by the CPU of a set of jump-evaluating-trace-designator instructions, but without reference to cooperation with a separate operating system. In such embodiments, the functions ascribed to trace designator 100, or any of its functional modules, typically are performed by the CPU executing such software instructions in cooperation with aspects of operating system 120 other than trace designator 100. Therefore, in such embodiments, cooperation by trace designator 100 with aspects of an operating system will not be stated, but will be understood to be implied.

The computer system that implements the present invention is referred to herein as the "user computer." It will be understood, however, that such term is intended to include any type of computing platform, whether or not operated by a user.

User Computer 110

FIG. 1 is a simplified functional block diagram of one exemplary embodiment of a computer system, referred to as user computer 110, on which trace designator 100 is implemented. User computer 110 may be a personal computer, network server, workstation, or other computer platform now or later developed. User computer 110 may also be a device specially designed and configured to support and execute the functions of trace designator 100 as described below. User computer 110 includes known components including processor 105, operating system 120, main memory 130, cache memory 140, memory storage device 150, and input-output devices 160. It will be understood by those skilled in the relevant art that there are many possible configurations of the components of user computer 110 and that some components that may typically be included in user computer 110 are not shown, such as a video card, data backup unit, and many other devices.

Processor 105 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, or it may be one of other processors that are or will become available. In one aspect of the illustrated embodiment, processor 105 is a PA-8000 RISC processor made by Hewlett-Packard Company.

Processor 105 executes operating system 120, which may be, for example, one of the DOS, Windows 3.1, Windows for Work Groups, Windows 95, or Windows NT operating systems from the Microsoft Corporation; the System 7 or System 8 operating system from Apple Computer; the Solaris operating system from Sun Microsystems; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. In one aspect of the illustrated embodiment, operating system 120 is the HPUX version of the Unix® operating system made by Hewlett-Packard Company. Operating system 120 interfaces with firmware and hardware in a well-known manner, and facilitates processor 105 in coordinating and executing the functions of the other components of user computer 110.

Main memory 130 may be any of a variety of known memory storage devices or future memory devices, including, for example, any commonly available random access memory (RAM), magnetic medium such as a resident hard disk, or other memory storage device. Cache memory 140 may similarly be any of a variety of known memory storage devices or future devices, including the examples noted above with respect to main memory 130.

Memory storage device 150 may be any of a variety of known or future devices, including a compact disk drive, a tape drive, a removable hard disk drive, or a diskette drive. Such types of memory storage device 150 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in main memory 130, cache memory 140, and/or the program storage device used in conjunction with memory storage device 150. Such computer software programs, when executed by processor 105, enable user computer 110 to perform the functions of the present invention as described herein. Accordingly, such computer software programs may be referred to as controllers of user computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 160 could include any of a variety of known devices for presenting information to a user, whether a human or a machine, whether local or remote. Such devices include, for example, a video monitor, printer, audio speaker with a voice synthesis device, network card, or modem. Input-output devices 160 could also include any of a variety of known removable storage devices, including a compact disk drive, a tape drive, a removable hard disk drive, or a diskette drive.

Trace designator 100 could be implemented in the "C" programming language, although it will be understood by those skilled in the relevant art that many other programming languages could also be used. Also, as noted, trace designator 100 may be implemented in any combination of software, hardware, or firmware. If implemented in software, trace designator 100 may be loaded into memory storage device 150 through one of input-output devices 160. Preferably, all or portions of trace designator 100 may also reside in a read-only memory or similar device of memory storage device 150, such devices not requiring that trace designator 100 first be loaded through input-output devices 160. It will be understood by those skilled in the relevant art that trace designator 100, or portions of it, may typically be loaded by processor 105 in a known manner into main memory 130, or cache memory 140, or both, as advantageous for execution.

Figure 2:
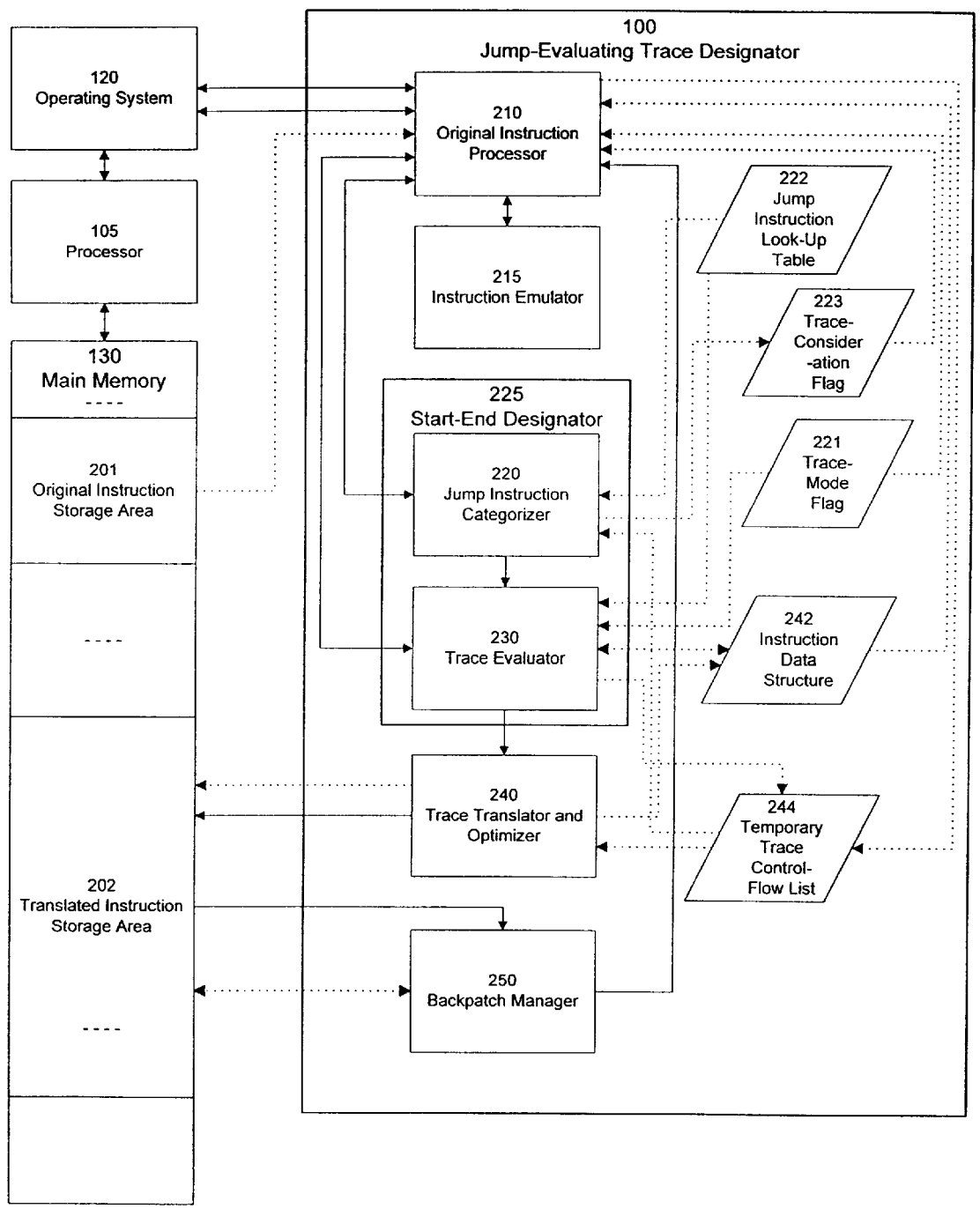
FIG. 2 is a functional block diagram of one embodiment of a jump-evaluating trace designator of FIG. 1, including its input and output connections to other elements of the computer system of FIG. 1.

Executable file 170 may be any of a variety of known executable files or an executable file of a type to be developed in the future. Examples of such known files are those having an extension of ".exe" operating under a DOS or Windows operating system or an "a.out" file of a Unix®-type operating system. Executable file 170 may typically be loaded through an input device of input-output devices 160, such as a diskette drive, and a copy of it placed by processor 105 into memory storage device 150 or main memory 130. A copy of executable file 170, or portions of it, (hereafter, simply referred to as executable file 170) may alternatively be placed by processor 105 into cache memory 140 for speedier execution. In the illustrated embodiment, it will be assumed for clarity that operating system 120 causes processor 105 to place the instructions and data of executable file 170, constituting the "original instructions," in main memory 130 for execution. The portion of main memory 130 in which such original instructions are stored is schematically represented in FIG. 2 as original instruction storage area 201.

Jump-evaluating Trace Designator 100

Jump-evaluating trace designator 100 designates traces for dynamic translation based on an evaluation of control flow through jump instructions. Trace designator 100 also translates and optimizes such traces. As shown in FIG. 2, trace designator 100 includes original instruction processor 210, instruction emulator 215, start-end designator 225, trace translator and optimizer 240, and backpatch manager 250. Original instruction processor 210 assumes control over the execution of original instructions of executable file 170 and selectively directs control among other functional modules of trace designator 100. Instruction emulator 215 emulates original instructions. Start-end designator 225 designates the starts and ends of traces and creates a temporary record of the control flow of traces. Trace translator and optimizer 240 translates and optimizes traces designated by designator 225. Backpatch manager 250 backpatches jump instructions in translated instructions so that they jump to target instructions that have been translated, when present.

Original Instruction Processor 210

Figure 3:
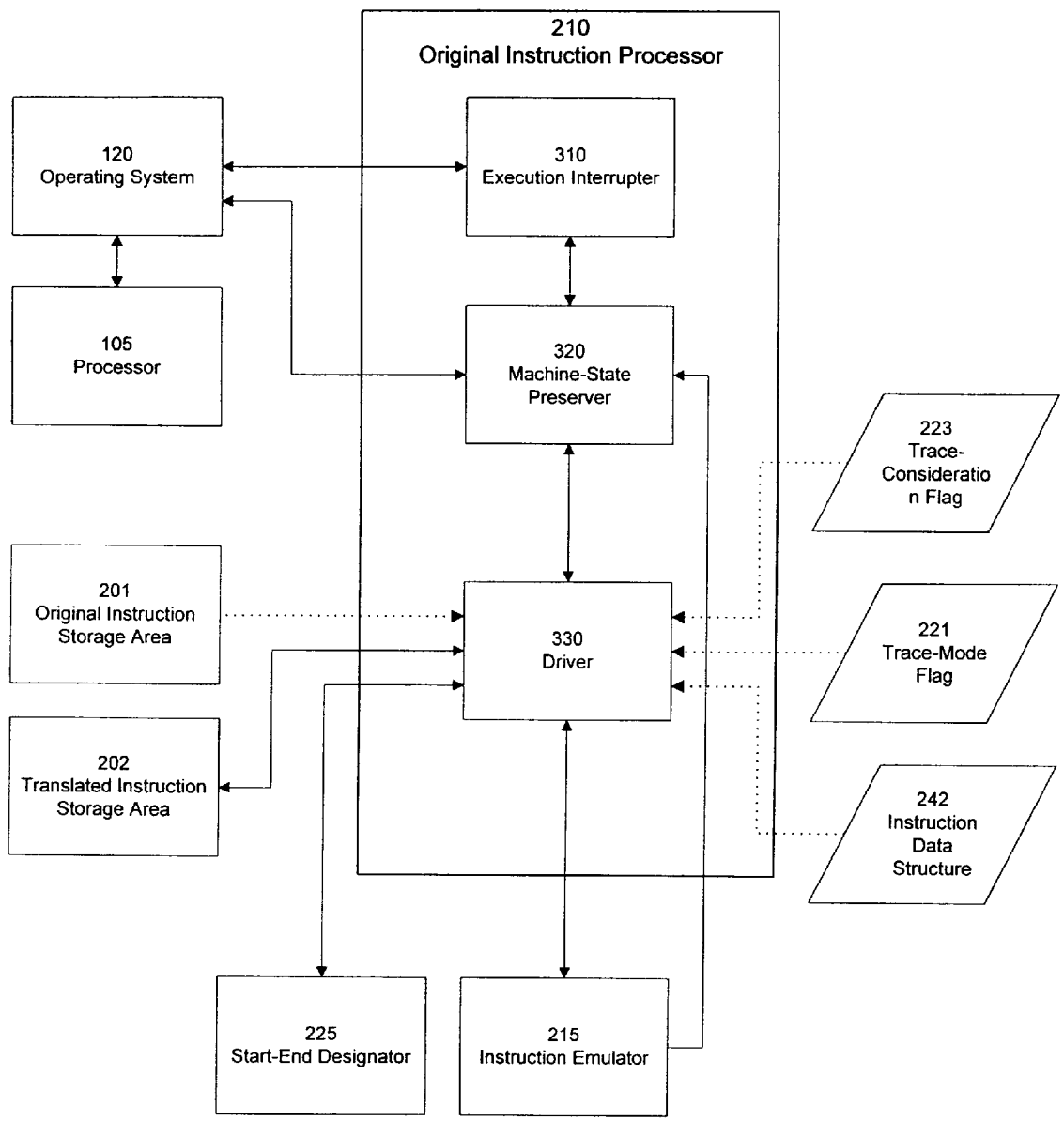
FIG. 3 is a functional block diagram of one embodiment of an original instruction processor of the jump-evaluating trace designator of FIG. 2, including the input and output connections of the original instruction processor to other elements of the jump-evaluating trace designator of FIG. 2 and of the computer system of FIG. 1.

As noted, original instruction processor 210, in cooperation with operating system 120 and processor 105, assumes control over the execution of original instructions of executable file 170. Original instruction processor 210 also selectively directs control among instruction emulator 215, start-end designator 225, and translated and optimized instructions in translated instruction storage area 202 of main memory 130. As shown in FIG. 3, original instruction processor 210 includes execution interrupter 310, machine-state preserver 320, and driver 330. Execution interrupter 310 suspends conventional instruction execution by processor 105 and transfers control over instruction execution to original instruction processor 210. Machine-state preserver 320 preserves the state of user computer 110 that existed prior to the operation of trace designator 100, and reinstates such state after trace designator 100 completes or terminates its operations. Driver 330 selectively directs control among various functional modules of trace designator 100 and to translated instructions.

As noted, execution interrupter 310, in accordance with any of a variety of known techniques, suspends conventional execution of the original instructions of executable file 170 by processor 105 under the direction of operating system 120. Also in a known manner, execution interrupter 310 transfers control over instruction execution to original instruction processor 210. After trace designator 100 completes or terminates its operations, execution interrupter 310 returns control over instruction execution to processor 105 under the direction of operating system 120.

As noted, machine-state preserver 320 preserves the state of various machine values or conditions of user computer 110, such as the values of registers, status flags, or system memory locations, prior to the altering of any such values or conditions by trace designator 100. Machine-state preserver 320 also reinstates such values or conditions after trace designator 100 completes or terminates its operations. Thus, user computer 110 is returned to its state prior to the operation of trace designator 100. Such functions of machine-state preserver 320 are accomplished in accordance with any of a variety of known techniques.

Figure 5:
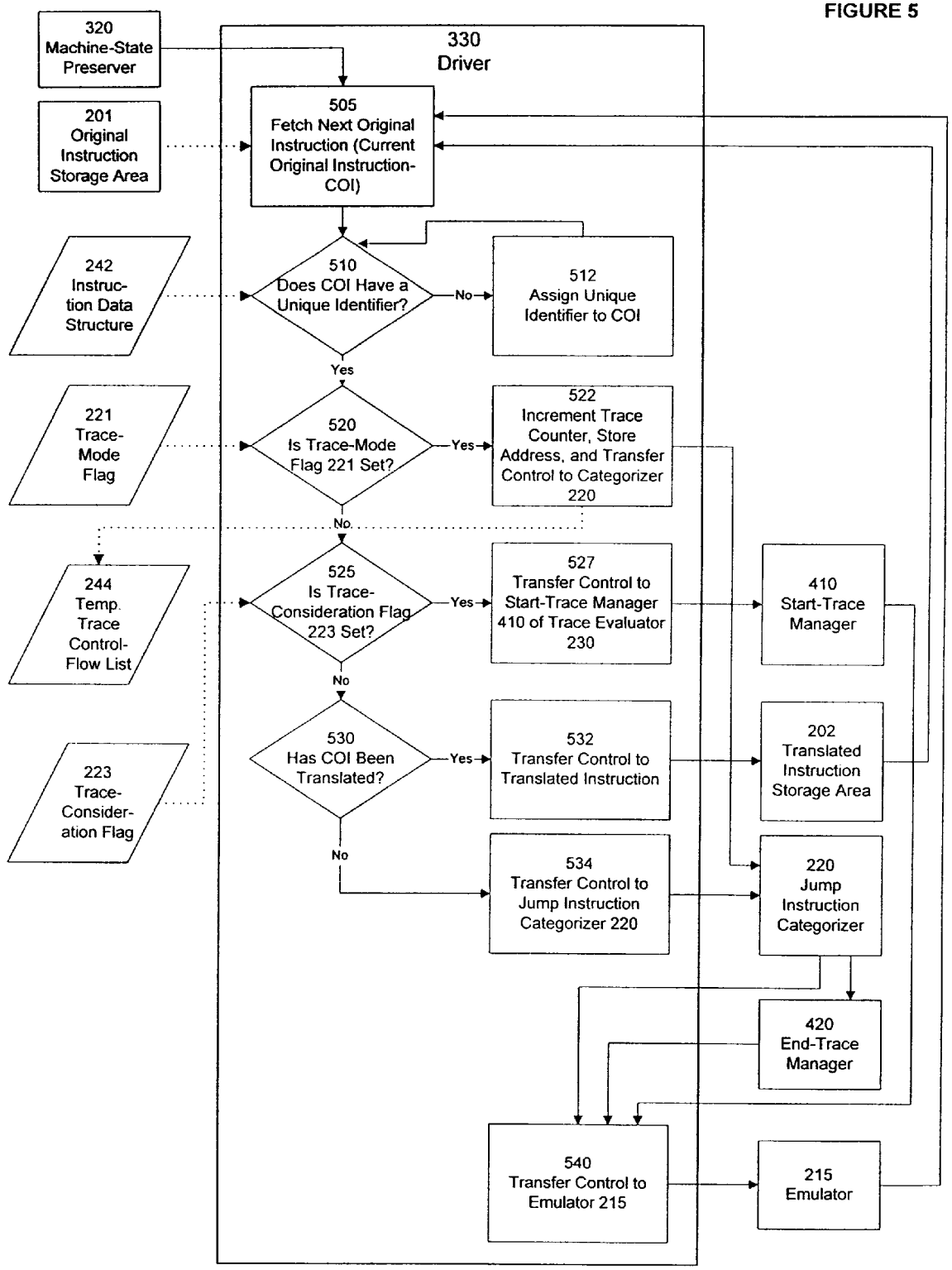
FIG. 5 is a simplified flow diagram showing one implementation of a decision-making structure applied to one embodiment of a driver of the original instruction processor of FIG. 3.

As noted, driver 330 selectively directs control among instruction emulator 215, start-end designator 225, and translated and optimized instructions in translated instruction storage area 202. FIG. 5 is a simplified flow diagram schematically illustrating the selective flow of control exercised by driver 330. As shown in FIGS. 3 and 5, driver 330 fetches an instruction from original instruction storage area 201, typically starting with the first original instruction (see function block 505). Such fetching is carried out in accordance with any of a variety of known techniques. Hereafter, the original instruction most recently fetched by driver 330 is referred to as the "current original instruction (COI)."

Provided that a unique identifier of the current original instruction has not already been assigned (see decision element 510), driver 330 assigns one (see function block 512) and temporarily stores such identifier in an appropriate location in memory 130 (not shown) so that it may be accessed by other functional modules, as described below. In the illustrated embodiment, a hash-table entry representing the address of the current original instruction in original instruction storage area 201 advantageously serves as its unique identifier. However, any other technique that enables the address of the current original instruction to be determined from such unique identifier may be used in alternative embodiments. In the illustrated embodiment, it is not material to the present invention whether such unique identifier is the absolute address of the current original instruction, its address relative to a base address, an address obtained from a hash table, or another known representation. Moreover, in alternative embodiments, not all original instructions need be assigned a unique identifier. In some aspects of such alternative embodiments, only original instructions that are target instructions are assigned a unique identifier.

Employing any of a variety of known search-and-compare techniques, driver 330 searches entries in the fields of column 902 of instruction data structure 242, shown in FIG. 9, to determine if there is a match between the unique identifier of the current original instruction and such an entry. Each row of instruction data structure 242 represents data regarding a particular original instruction; thus, each row is sometimes referred to hereafter as an original instruction record. For example, if the current original instruction is assumed to correspond to instruction "B" in the illustrative representation of FIG. 9, then record B contains information regarding the current original instruction. Its unique identifier is therefore stored in field 902B. It will be understood that the left-most column and upper-most row of instruction data structure 242 as illustrated in FIG. 9, respectively containing row or record letters, and column-headings, are provided for reference only.

If there is no match between the unique identifier of the current original instruction and any entry in column 902, driver 330 in a known manner creates a new original instruction record by creating a new row of entries in instruction data structure 242, such as, for example, row N for record N. Driver 330 stores the unique identifier of the current original instruction in the appropriate field in column 902; that is, field 902N in this example.

Having fetched the current original instruction and assigned a unique identifier to it, driver 330 determines to which functional module, or to which translated instruction, control should pass. Such determination depends generally on into which of the following categories the current original instruction falls: (a) a start-trace eligible jump instruction (so that consideration should be given to starting a trace); (b) a target instruction of a start-trace eligible jump instruction (so that a trace is started if such target instruction's start-trace counter is greater than the start-trace threshold of the start-trace eligible jump instruction); (c) if a trace has been started, a jump instruction that, when added to the trace, causes the trace to equal or exceed the maximum trace length; (d) if a trace has been started, an end-trace-eligible jump instruction (so that the trace is ended if such instruction has an end-trace threshold equal to or less than the number of times that jump instructions of such type have been encountered in the started trace); or (e) a previously translated original instruction (so that control is passed to such translated instruction).

Start-End Designator 225

If the current original instruction falls into one of such categories (a), (b), (c) or (d), control passes from driver 330 to start-end designator 225 for processing in accordance with the appropriate category. The functions of start-end designator 225 and driver 330 are now described with respect to the functional block diagrams of FIG. 3 (showing original instruction processor 210, including driver 330) and FIG. 4 (showing trace evaluator 230 of start-end designator 225).

Figure 6:
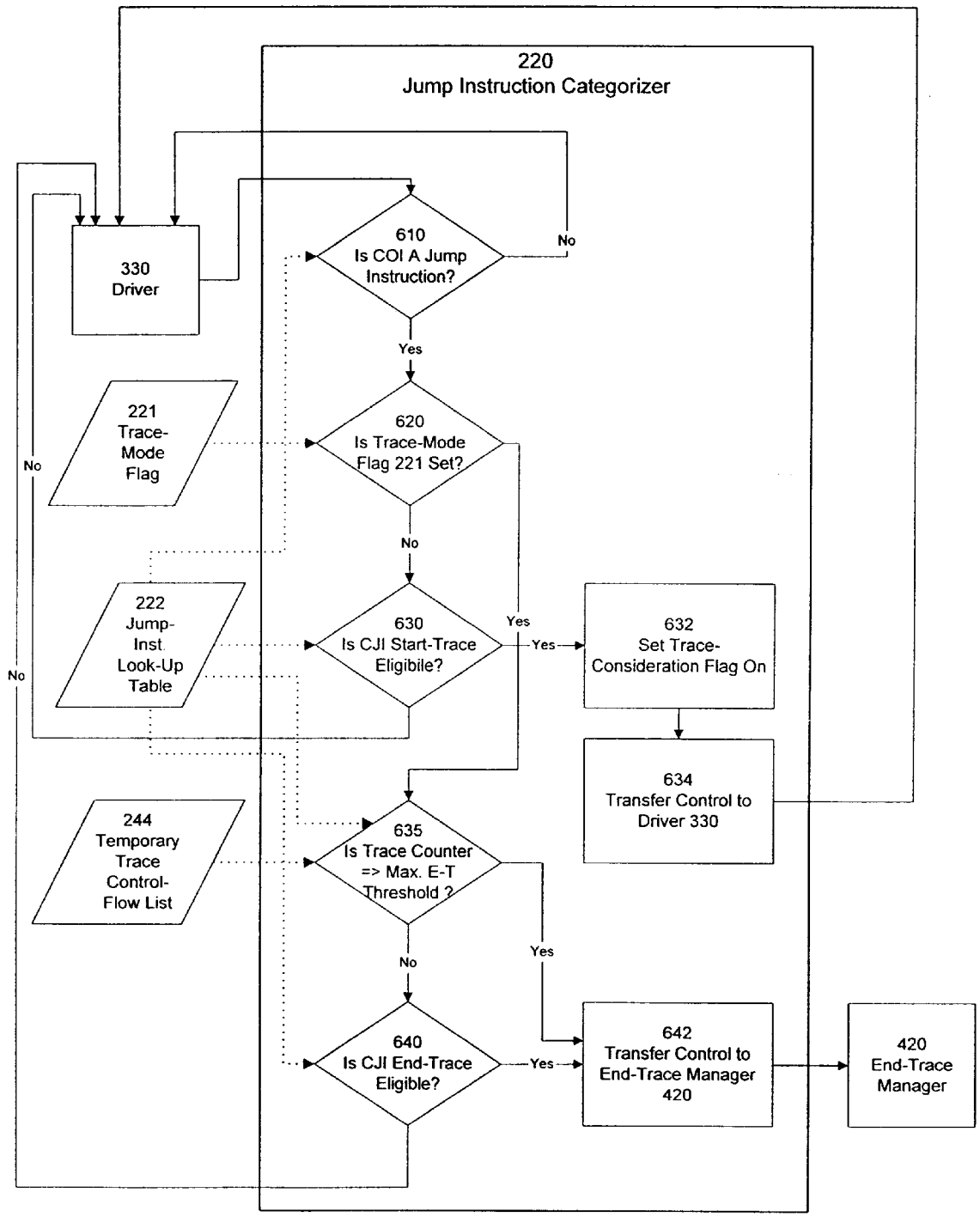
FIG. 6 is a simplified flow diagram showing one implementation of a decision-making structure applied to one embodiment of a jump instruction categorizer of the start-end designator of the jump-evaluating trace designator of FIG. 2.
Figure 7:
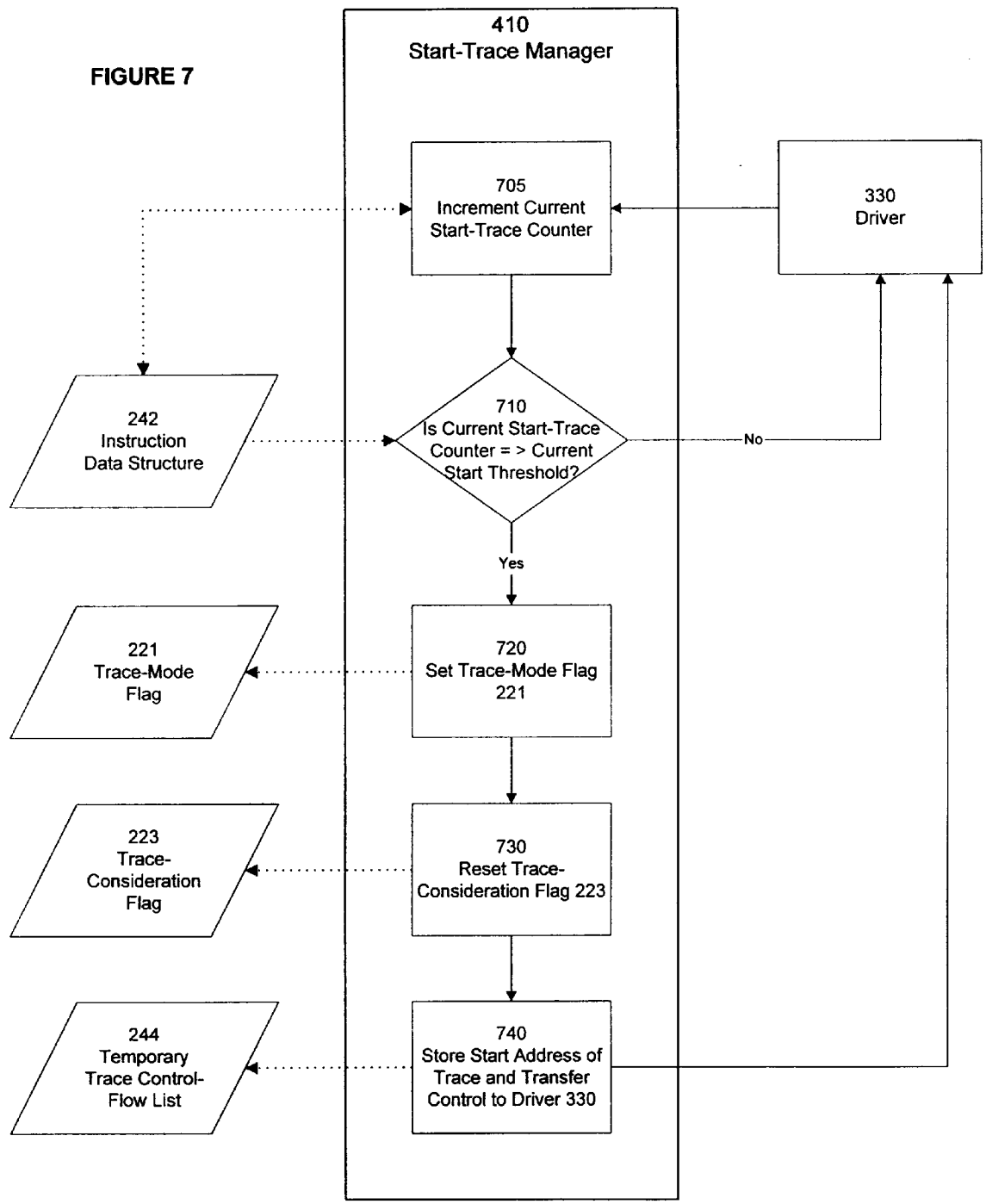
FIG. 7 is a simplified flow diagram showing one implementation of a decision-making structure applied to one embodiment of a start-trace manager of the trace evaluator of FIG. 4.
Figure 11:
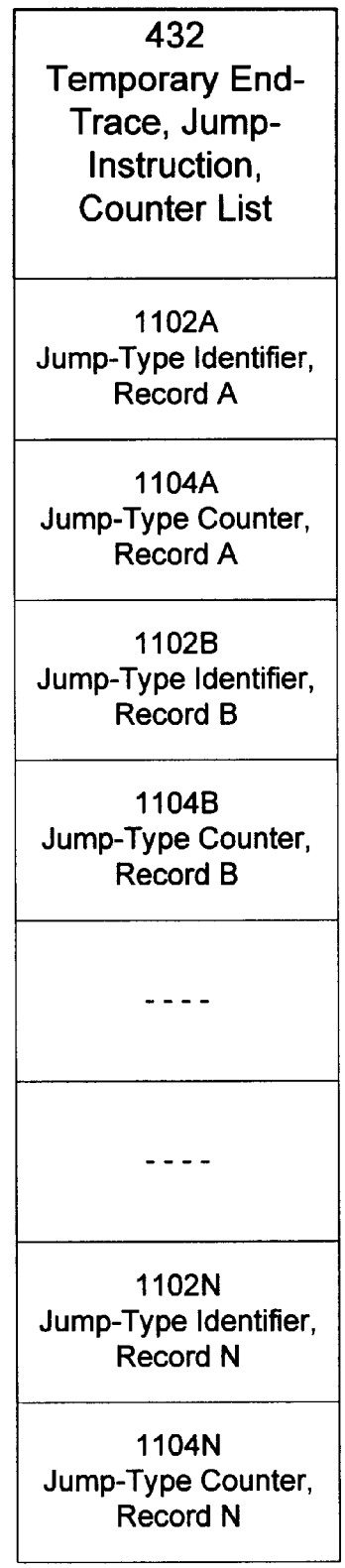
FIG. 11 is a schematic representation of one embodiment of a temporary end-trace, jump-instruction, counter list of the trace evaluator of FIG. 4.

Also, FIGS. 5–8 are provided to more clearly describe some of many possible decision-making structures appropriate for implementing the functions of driver 330 and start-end designator 225. Specifically, FIGS. 5, 6, and 7 are simplified control flow diagrams showing implementations of decision-making structures with respect to driver 330, jump instruction categorizer 220, and start-trace manager 410, respectively. It will be understood that the decision-making elements, function blocks, and connections among them, as shown in FIGS. 5–7, are exemplary illustrations only, and that many variations may be employed in accordance with the present invention. For example, rather than using flags to direct decision-making and control flow, such flow could, in alternative embodiments, be directed by values passed as arguments of jump instructions, stored in data structures, stored in index values for multi-way jump instructions, or implemented by other techniques known to those skilled in the relevant art, now or in the future.

(a) Starting a Trace—Determining if Current Original Instruction is Start-Trace Eligible.

As represented by decision-making element 520, driver 330 checks trace-mode flag 221, described below, to determine if a trace mode has been established. The phrase "trace mode" is used herein to denote that start-end designator 225 has designated the start of a trace and is in a mode to determine if the trace should be ended. Assuming for illustrative purposes that flag 221 is not set, driver 330 checks trace-consideration flag 223, described below, to determine if a the starting of a trace is under consideration (see decision-making element 525).

If flag 223 is not set, driver 330 determines whether the current original instruction has been translated (see decision-making element 530). Assuming the example in which the original instruction record of the current original instruction is record B, such determination is made by examining the content of column 904B of instruction data structure 242, shown in FIG. 9. As described below, representations of the translated addresses of original instructions that have been translated are stored in column 904 of instruction data structure 242. Thus, if entry 904B contains a non-initialized value, such value is a representation of the address of the translated instruction that corresponds to the current original instruction, thus indicating that the current original instruction has been translated.

If the current original instruction has been translated, driver 330 transfers control to the address represented by the entry in 904B so that the translated instruction corresponding to the current original instruction is executed (see function block 532). If the current original instruction has not been translated, driver 330 transfers control to jump instruction categorizer 220 of start-end designator 225 (see function block 534).

As noted, start-end designator 225 designates the starts and ends of traces and creates a temporary record of the control flow of traces. As shown in FIG. 2, start-end designator 225 includes jump instruction categorizer 220 and trace evaluator 230. Categorizer 220 determines whether the current original instruction is a jump instruction and, if so, whether it is start-trace or end-trace eligible. Categorizer 220 also determines whether a trace should be terminated because it has become too long. Trace evaluator 230 determines at which instructions to start and end a trace, and records the control flow through the trace.

In the illustrated embodiment, categorizer 220 makes the noted determinations with respect to start-trace or end-trace eligibility by accessing information in jump instruction look-up table 222. FIGS. 8A and 8B show an exemplary embodiment of table 222 containing information relating to 34 types of jump instructions. These 34 types represent one scheme for uniquely identifying the types of jump instructions that typically are encountered in a file that is executable by the PA-8000 RISC architecture of processor 105 of the illustrative embodiment.

In accordance with this scheme, jump instructions are broadly divided into two categories: direct and indirect. A direct or indirect jump may be backward or forward. Direct jump instructions are those that jump directly to an address. Direct jump instructions can be either conditional or unconditional. In an embodiment in which processor 105 is the PA-8000 RISC processor made by Hewlett-Packard Company, indirect jumps can be unconditional, but cannot be conditional. In alternative embodiments, in which another processor is used, such a requirement need not apply, and thus alternative categories may be defined with respect to table 222. A particular execution of a conditional jump may result in the condition being met, in which case control passes to the address specified in the jump instruction. Alternatively, the condition may not be met, in which case control "falls-through" to the succeeding instruction in sequence.

Indirect jump instructions are those that jump to a register or memory location that contains an address to which control then jumps. Indirect jumps can be further divided based on the portion of the address space into which they jump. For example, in an embodiment in which operating system 120 is the HPUX Unix®-type operating system available from Hewlett-Packard Company, the address space accessible for a user process is divided into multiple spaces. Thus, an indirect jump instruction can be categorized according to whether the target of such jump instruction is located in the same, or different, of such multiple spaces as compared to the jump instruction. Also, any jump instruction may potentially be nullified by a preceding instruction; that is, the preceding instruction may cause the succeeding jump instruction not to be executed. Such potentially nullified jump instructions are referred to in table 222 as being in a "skip shadow." In addition, table 222 includes as categories of jump instructions those that implement a system call or an exit from the code cache.

It will be understood that it is not necessary for the operation of the present invention that jump instructions be categorized according to the categories just described. Any categorization of a jump instruction based on, for example, the location of the jump instruction, the flow of control to or from such instruction, the type or location of instruction transferring control to the jump instruction, the type or location of the target of the jump instruction, and other factors, may be employed to create table 222 that operates in accordance with the present invention. Any such table, or data base, generally may be referred to herein as a "jump-instruction look-up table."

The entries in each of the columns of table 222 will now be described. It will be understood that the row numbers in the left-most column, the entries in column A, and the column titles in the top row, are provided for reference only. The entries in column A are short descriptions of each of the illustrative 34 types of jump instructions. Advantageously, such types of jump instructions are mutually exclusive in the illustrative embodiment.

Column B contains arbitrary symbolic entries that represent identifying attributes of each of the illustrative 34 types of jump instructions. Such identifying attributes may include, for example, formatting characteristics; identifying numeric values, characters, or symbols; syntactic indicators; and so on. For example, the entry "UF" in column B of row 1 represents the identifying attributes of jump instructions of the type "unconditional forward." It will be understood by those skilled in the relevant art that such attributes may vary depending on the type of CPU or compiler that is used, and other factors.

The entries in column C of table 222 represent jump-instruction-specific start-trace thresholds. The term "jump-instruction-specific start-trace threshold" refers to a start-trace threshold that corresponds to a specific type of jump instruction. Thus, for example, the number "5" in column C of row 2 indicates that the start-trace threshold for a jump instruction that is of the "unconditional backward" type has a value of "5." Arbitrarily, the number "0" is used throughout illustrative table 222 of FIGS. 8A and 8B to indicate that the start-trace (or end-trace) threshold is a threshold that can never be reached. That is, the number "0" indicates that the type of jump instruction for the corresponding row is start-trace (or end-trace) ineligible.

Similarly, the entries in columns D and E represent jump-instruction-specific end-trace thresholds. The term "jump-instruction-specific end-trace threshold" refers to an end-trace threshold that corresponds to a specific type of jump instruction. Different end-trace thresholds may be provided depending on the type of jump instruction and whether the target of the jump instruction taken in a particular execution is within the same trace as the jump instruction. The jump-instruction-specific end-trace thresholds shown in column D are those that apply if the target of a jump instruction for a particular execution is within the same trace as the jump instruction. Those shown in column E are those that apply if the target of a jump instruction for a particular execution is not within the same trace as the jump instruction. Thus, for example, the number "1" in column D of row 5 indicates that the jump-instruction-specific end-trace threshold for a jump instruction, which, in a particular execution, is a backward taken unconditional jump in a skip shadow, and has a target instruction within the same trace, has a value of 1. The number "0" in column E of row 5 indicates that the jump-instruction-specific end-trace threshold is never reached for a jump instruction, that, in a particular execution, is a backward taken unconditional jump in a skip shadow, and has a target instruction that is not within the same trace. That is, the jump instruction of row 5 is end-trace ineligible for an execution in which the target instruction is not within the same trace.

The entries in column F are jump-instruction-specific maximum end-trace thresholds for each of the types of jump instructions (also referred to herein as "jump-instruction-specific maximum numbers"). That is, if a trace consists of a number of instructions that is larger than the maximum end-trace threshold for the particular type of jump instruction through which control has most recently passed, the trace is terminated. For example, if control has most recently passed through a jump instruction that is of the type represented in row 1 of the illustrative table 222 (an unconditional forward jump instruction, referred to hereafter for convenience as a "type 1 jump instruction"), the trace typically would not be terminated. The reason for typically not terminating the trace is that a type 1 jump instruction typically is end-trace ineligible, as indicated in columns D and E of row 1. However, if a trace instruction counter, described below, has reached the maximum trace length of 200 instructions specified with respect to a type 1 jump instruction, as indicated in column F of row 1, the trace is nevertheless terminated. Such termination may be advantageous, for example, if a trace has become longer than is desirable for storage in cache memory 140. (As noted, cache memory 140 may be used for speedier execution than may be available if main memory 130 had been used, but typically cache memory is smaller than main memory.)

All values in columns C–F of table 222 may be determined heuristically with regard, for example, to the dynamic optimization techniques that may be employed. For example, unrolling of loops potentially results from the setting of values greater than one for the entries in column D. Moreover, the number of times that a loop is unrolled generally is determined by such value. It will be understood that the particular values in the entries in columns C–F of FIGS. 8A and 8B are shown for illustrative purposes.

As noted, categorizer 220 determines whether the current original instruction is a jump instruction and, if so, whether it is start-trace eligible or end-trace eligible. Categorizer 220 also determines whether a trace should be terminated because the number of instructions in the trace has met, or exceeded, a maximum end-trace threshold; i.e., the trace has become too long. FIG. 6 is a simplified flow diagram showing one implementation of a decision-making structure applied to categorizer 220.

Upon receiving control from driver 330 (as described above with respect to function block 534), categorizer 220 determines whether the current original instruction is a jump instruction (see decision element 610 of FIG. 6). Such determination is made by comparing one or more identifying attributes of the current original instruction with each of the attribute entries in rows 1–34 of column B of table 222. Such comparison may be accomplished in accordance with any of a variety of known search-and-compare techniques. If categorizer 220 determines that none of the entries in column B for rows 1–34 match the attributes of the current original instruction, i.e., that the current original instruction does not have the attributes of any one of the 34 types of jump instructions of table 222, then categorizer 220 returns control to function element 540 of driver 330 with an indication, in accordance with any of a variety of known techniques, that control is to be transferred to emulator 215. As shown in FIG. 5, driver 330 then transfers control to instruction emulator 215.

In accordance with any of a variety of known techniques, instruction emulator 215 emulates the current original instruction. That is, instruction emulator 215 mimics the operations that processor 105 would have applied to the current original instruction. Emulator 215 then returns control to driver 330. In the known manner noted above, driver 330 fetches the next original instruction as indicated by the program counter, such next original instruction thus becoming the new current original instruction (see function block 505). As described above, driver 330 determines whether such current original instruction has a unique identifier and whether either trace-mode flag 221 or trace-consideration flag 223 is set. If a unique identifier is found or assigned, if neither flag is set, and if it is determined that the current original instruction has not been translated, then driver 330 transfers control to jump instruction categorizer 220.

It is now assumed for purposes of illustration that jump instruction categorizer 220 determines that the identifying attributes of the current original instruction match the identifying attributes of one of the types of jump instructions included in look-up table 222. Such current original instruction is thus hereafter referred to as the current jump instruction (CJI). For example, the identifying attributes of the current original instruction may be assumed to match the identifying attributes symbolically represented as "UF" in row 1, column B, as shown in FIG. 8A, thus indicating that the current jump instruction is of the "unconditional forward" type.

Having found a match, jump instruction categorizer 220 determines whether a trace has been started; i.e., whether trace designator 100 is in a trace mode. Such determination is made in the illustrative embodiment by determining whether trace-mode flag 221 is set (see decision element 620). If it is not, then categorizer 220 determines whether the current jump instruction is start-trace eligible (see decision element 630). Such determination is made in the illustrated embodiment by examining the entry in column C of look-up table 222 for the type of jump instruction that matches the current jump instruction. Such entry is the start threshold for the current jump instruction, referred to hereafter as the "current start threshold."

In the current example, in which the current jump instruction is assumed to have been identified as being of the "unconditional forward" type, the current start threshold is the content of row 1, column C, which is the value "0." As noted, the value "0" is used in this illustrative embodiment of look-up table 222 to indicate that a particular type of jump instruction is start-trace or end-trace ineligible. If categorizer 220 thus determines that the current start threshold is "0," and therefore that the current jump instruction is start-trace ineligible, control is returned to driver 330 with an indication in a known manner that control is to be transferred to emulator 215. As noted, driver 330 then transfers control to instruction emulator 215 (see function block 540) to emulate the current jump instruction. As also noted, emulator 215 then returns control to driver 330 to fetch the next original instruction (see function block 505) and perform its other functions.

It will now be assumed for purposes of illustration that categorizer 220 determines that the current start threshold is a value other than "0." For example, it is assumed that the attributes of the current jump instruction match those symbolically represented by "UB" in row 2 of column B of look-up table 222; that is, that the current jump instruction is of the "unconditional backward" type. Thus, categorizer 220 determines from the content of column C or row 2 of table 222 that the current jump threshold is "5," and that the current jump instruction is therefore start-trace eligible (see decision element 630). Categorizer 220 transfers in any known manner such value of the current start threshold to start-trace manager 410 of trace evaluator 230, shown in FIG. 4. Categorizer 220 also sets trace-consideration flag 223 to indicate that the establishment of a trace mode is under consideration (see function block 632). Categorizer 220 transfers control to driver 330 (see function block 634) with an indication in a known manner that control is to be transferred to emulator 215. Driver 330 in turn transfers control to instruction emulator 215 to emulate the current jump instruction (see function block 540). Emulator 215 then returns control to driver 330 to fetch the next original instruction. Because the next original instruction assumes control from a jump instruction, it is a target instruction, hereafter referred to as the current target instruction.

Figure 4:
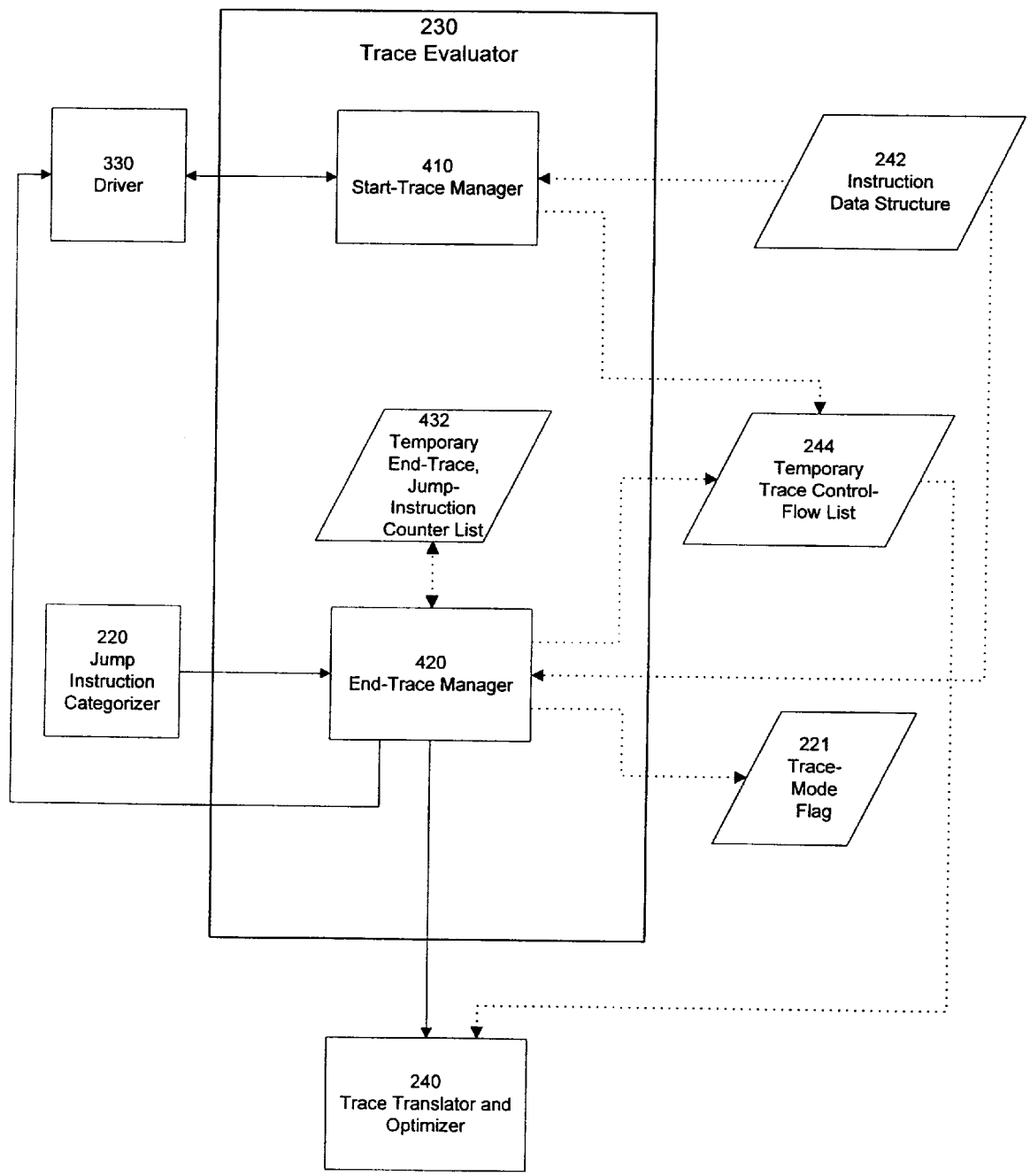
FIG. 4 is a functional block diagram of one embodiment of a trace evaluator of the jump-evaluating trace designator of FIG. 2, including the input and output connections of the trace evaluator to other elements of the jump-evaluating trace designator of FIG. 2.

(b) Starting a Trace—Determining if Current Start-Trace Counter Equals or Exceeds Current Start Threshold:

In the manner described above, driver 330 determines that trace-consideration flag 223 has been set (see decision element 525) and transfers control to start-trace manager 410 of trace evaluator 230 (see function block 527). FIG. 4 is a functional block diagram showing the functional elements of trace evaluator 230. As noted, trace evaluator 230 determines whether to start a trace and, if a trace is started, at which instruction to end the trace. Trace evaluator 230 also records information representing the control flow through the trace. Such information is schematically represented in FIG. 10 that shows one embodiment of temporary trace control-flow list 244. List 244 is labeled as temporary because its contents may be reinitialized, or overwritten, for each trace that is processed by trace designator 100. As shown in FIG. 4, trace evaluator 230 includes start-trace manager 410 and end-trace manager 420. Start-trace manager 410 increments the start-trace counter for the current target instruction and compares the incremented count to the current start threshold. End-trace manager 420 detects the end of the current trace.

As noted in the present example in which the current jump instruction is of the unconditional backward type and the trace consideration flag has been set, start-trace manager 410 receives control from driver 330. Also as noted, start-trace manager 410 has available the value of the current start threshold, as determined by jump instruction categorizer 220. Start-trace manager 410 searches the entries of column 902 of instruction data structure 242, as represented in FIG. 9, to find the original instruction record for the current target instruction (hereafter, the "current target instruction record"). Such search typically is conducted by comparing the unique identifier for the current target instruction with the entries in column 902. Start-trace manager 410 increments by one the value of start-trace counter 906 for the current target instruction record (referred to hereafter as the "current start-trace counter"; see function block 705). As will be evident to those skilled in the relevant art, such, and other, counters typically have been initialized to zero. It is assumed for illustrative purposes that the current target instruction record is record C of instruction data structure 242. Thus, in the present example, the value of the entry in field 906C is incremented by one.

Start-trace manager 410 then compares current start-trace counter 906C to the value of the current start threshold (see decision element 710 of FIG. 7). If current start-trace counter 906C is less than the value of the current start threshold, start-trace manager 410 transfers control to driver 330 to transfer control to emulator 215 (see function block 540) and, after emulation, to fetch the next original instruction (see function block 505). Start-trace manager 410 does not set trace-mode flag 221. If, however, current start-trace counter 906C is equal to or greater than the value of the current start threshold, then start-trace manager 410 sets trace-mode flag 221 (see function block 720) and resets trace-consideration flag 223 to indicate that a trace has been started (see function block 730). The value of current start-trace counter 906C may be greater than the value of the current start threshold because a previous incrementation may have been made with respect to a type of jump instruction having a start threshold greater than the start threshold of the current jump instruction.

In alternative embodiments, the value of the current start-trace counter may periodically be re-initialized after a period of time, after a number of original instructions have been processed by original instruction processor 210, after a number of jump instructions have been processed by jump instruction categorizer 220, or other events have occurred. In such alternative embodiments, the reaching of the start-trace threshold by the start-trace counter may be referred to as being determined by the frequency with which control has passed to the target instruction.

Start-trace manager 410 records the starting original instruction address of the trace that has been started, hereafter referred to as the current trace (see function block 740). In particular, start-trace manager 410 stores the unique identifier of the current target instruction in temporary trace control-flow list 244, which is schematically shown in FIG. 10. In this illustrative embodiment, list 244 holds representations of all of the original instruction addresses of the current trace. In alternative embodiments, representations of only the starts and ends of each basic block of the current trace need be stored. Having stored the start address of the current trace in field 1001, start-trace manager 410 transfers control to driver 330, which transfers control to emulator 215 (see function block 540). Emulator 215 then returns control to driver 330 to fetch the next original instruction (see function block 505).

(c) Ending a Trace—Determining if Maximum Trace Length Has Been Reached

In the manner noted, driver 330 fetches the next original instruction, such next original instruction thus becoming the new current original instruction. Driver 330 determines whether such current original instruction has a unique identifier and whether trace-mode flag 221 is set (see decision element 520), as it is in this illustrative example. Driver 330 increments by one trace instruction counter 1000 that, for convenience, is shown in FIG. 10 as being the first entry in temporary trace control-flow list 244 (see function block 522). It will be understood that any other of a variety of known methods may be used to count the number of instructions in the trace. Driver 330 also adds a new field at the end of temporary trace control-flow list 244 to store a representation of the address of the current original instruction. If, for example, the current original instruction is the second instruction of the current trace, a representation of its address is stored in field 1002 as shown in FIG. 10. Similarly, field 1003 is created to store the third instruction of the trace, and so on, for all instructions encountered for the current trace. That is, representations of original instruction addresses are stored sequentially in list 244 for all instructions processed by driver 330 while trace-mode flag 221 is set. Field 1099 of the illustrative list 244 represents the last such entry for the current trace. Having stored a representation of the current original instruction, driver 330 transfers control to jump instruction categorizer 220.

In the manner described above, categorizer 220 determines whether the current original instruction is a jump instruction (decision element 610). It is assumed for illustration that it is, and is therefore referred to as the current jump instruction. Because trace-mode flag 221 is set, categorizer 220 then determines whether trace instruction counter 1000 for the current trace is equal to, or greater than, the maximum end-trace threshold for the current jump instruction (see decision element 635). Such determination is made by comparing trace instruction counter 1000 to the entry in column F in look-up table 222 for the type of jump instruction corresponding to the current jump instruction. It is assumed for illustrative purposes that the current jump instruction has been identified by categorizer 220 as the type represented by the entries in row 5 of table 222. That is, the current jump instruction is of the type "unconditional in a skip shadow backward taken" (referred for convenience as type 5). Thus, categorizer 220 compares trace instruction counter 1000 to the maximum trace length value in column F of row 5 that, in illustrative FIG. 8A, is the number "200." If trace instruction counter 1000 is equal to or greater than this maximum trace length, categorizer 220 transfers control to end-trace manager 420 (see function block 642) with an indication, in accordance with any of a variety of known techniques, that the maximum trace length has been reached. End-trace manager 420 then resets trace-mode flag 221 to indicate that the current trace is ended. End-trace manager 420 also reinitializes list 432. Control is transferred to trace translator and optimizer 240 so that the current trace may be translated and optimized.

(d) Ending a Trace—Determining if End-Trace Threshold of Current Jump Instruction Exceeds End-Trace Counter for Corresponding Type of Jump Instruction:

It is now assumed for illustrative purposes that categorizer 220 determines that the value of trace instruction counter 1000 is less than the maximum trace length in column F of table 222 for the type of jump instruction corresponding to the current jump instruction. Categorizer 220 then determines, in accordance with any of a variety of known techniques, the original instruction address of the target of the current jump instruction. Also in a known manner, categorizer 220 compares such address to field 1001 of list 244 that contains a representation of the original instruction address of the first instruction in the current trace. If such comparison shows in any known manner that the target is within the trace, categorizer 220 examines the entry in column D of table 222. If such comparison shows in any known manner that the target is outside the trace, categorizer 220 examines the entry in column E.

It is assumed for illustrative purposes that the current jump instruction is determined by categorizer 220 to be of the type "unconditional in a skip shadow backward taken" (type 5), and that the target is within the trace. Thus, categorizer 220 determines that the end-trace threshold for the current jump instruction is the value "1," as indicated in column D of row 5 of FIG. 8A. As noted, the value "0" is arbitrarily chosen in illustrative FIGS. 8A and 8B to represent an end-trace ineligible jump instruction. Therefore, the current jump instruction is end-trace eligible (see decision element 640) and control is transferred to end-trace manager 420 (see function block 642). If the current jump instruction had been end-trace ineligible, control would have been transferred to driver 330, which would have transferred control to emulator 215 (see function block 540). Emulator 215 would then return control to driver 330 to fetch the next original instruction for fetching of the next original instruction.

End-trace manager 420 searches temporary end-trace jump-instruction counter list 432 to determine if a type 5 jump instruction has previously been encountered in the current trace. Such determination is made in accordance with any of a variety of known techniques, such as by comparing any arbitrary representation of a type 5 instruction with the contents of jump-type identifier fields 1102 of list 432, shown in FIG. 11. If no match is found, end-trace manager 420 creates a new record including a jump-type identifier field 1102 and a jump-type counter field 1104. It is assumed for illustrative purposes that the current jump instruction is the first type 5 jump instruction encountered in the current trace. (More precisely, in the illustrative embodiment, it is the first end-trace eligible, type 5 jump instruction.) As noted below, temporary list 432 is initialized so that all records are deleted after the end of a trace has been identified. Therefore, no match is found, and end-trace manager 420 adds a new record, for example, record A, to list 432. End-trace manager 420 stores the representation "5" in jump-type identifier field 1102A and increments by one the corresponding jump-type counter field 1104A. Thus, in this illustrative example, the value of field 1104A is "1."

End-trace manager 420 then determines whether the jump-type counter for the current jump instruction (hereafter, the "current jump-type counter") equals or exceeds the end-trace threshold for the current jump instruction. Such determination is made in this illustrative example by comparing the value in field 1104A with the entry in column D of row 5 of table 222. If the current jump-type counter is less than the end-trace threshold for the current jump instruction, then end-trace manager 420 transfers control to driver 330 so that it may transfer control to emulator 215, which returns control to driver 330 to fetch the next original instruction. However, in the present example, the jump-type counter is equal to the end-trace threshold for the current jump instruction. Therefore, end-trace manager ends the trace in the manner noted above, i.e., by resetting trace-mode flag 221, re-initializing list 432, and transferring control to trace translator and optimizer 240.

In alternative embodiments, the value of the current jump-type counter may periodically be re-initialized after a period of time, after a number of original instructions have been processed by original instruction processor 210, after a number of jump instructions have been processed by jump instruction categorizer 220, or other events have occurred. In such alternative embodiments, the reaching of the end-trace threshold by the current jump-type counter may be referred to as being determined by the frequency with which control has passed through the jump instruction.

Trace Translator and Optimizer 240 and Backpatch Manager 250

In accordance with any of a variety of known techniques, trace translator and optimizer 240 (hereafter, simply "translator 240") translates and optimizes the current trace as such trace is defined by temporary trace control-flow list 244. Such translated and optimized instructions are stored by translator 240 in translated instruction storage area 202. The addresses of such instructions in storage area 202 are generally referred to hereafter as "translated instruction addresses." In a known manner, translator 240 provides that jumps out of the translated instruction addresses are made to backpatch manager 250. For such jumps, the address of the target instruction in original instruction storage area 201 (hereafter, the "backpatched target instruction address") is passed to backpatch manager 250 in a known manner. Translator 240 stores the corresponding translated instruction addresses, when present, into column 904 of the corresponding original instruction record in instruction data structure 242. For example, translator 240 compares the representation of the original instruction address of trace instruction number 1, as stored in field 1001 of temporary trace control-flow list 244, with the entries in column 902 of instruction data structure 242. It is assumed for illustrative purposes that such trace instruction number 1 matches entry 902C. Translator 240 then stores in field 904C the translated instruction address corresponding to trace instruction number 1. Such process is carried out for each trace instruction address in list 244. Translator 240 also re-initializes temporary trace control-flow list 244.

Also in accordance with any of a variety of known techniques, backpatch manager 250 backpatches translated jump instructions so that they pass control to target instructions that have also been translated, when present. As noted, driver 330 examines the entry in column 904 of instruction data structure 242 to determine if the current original instruction has been translated (see decision element 530). If it has, control is transferred to the translated instruction address for execution. Also as noted, jumps out of the translated instruction addresses are made to backpatch manager 250. Backpatch manager 250 compares the backpatched target instruction address with the entries in column 902 of instruction data structure 242 to find the original instruction record of such backpatched target instruction. Backpatch manager 250 then examines column 904 to determine if the backpatched target instruction has been translated. If it has, then backpatch manager 250 substitutes the translated instruction address for the backpatched target instruction address. Thus, if driver 330 subsequently passes control to a translated instruction address, and control reaches the backpatched jump instruction, control advantageously will pass directly to the translated target instruction. As noted, without such backpatching, control would have passed from the jump instruction to driver 330 and then back to the translated target address.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. The functions of any module may be carried out in various ways in alternative embodiments. In particular, numerous variations are contemplated in accordance with the present invention to count control flow through various types of jump instructions, and to set threshold values, in order to designate the start or end of a trace. Also, there are many possible variations of the architecture for the data structures described above, including jump instruction look-up table 222, instruction data structure 242, temporary trace control-flow list 244, and temporary end-trace jump-instruction counter list 432. It will be evident to those skilled in the relevant art that such, and other, data structures typically are stored in memory 130, although one or more could be stored in cache memory 140, memory storage device 150, or another device for storing data. As will be evident to those skilled in the relevant art, the values in data structures generally are initialized or re-initialized in accordance with any of a variety of known techniques to provide that such values are accurate. Such initializations or re-initializations of data structures therefore are assumed, but may not be further described, for the various data structures, including flags, of the illustrated embodiment or alternative embodiments. In addition, it will be understood by those skilled in the relevant art that control and data flows between and among functional modules of the invention and various data structures may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various described data structures may be combined; the sequencing of functions or portions of functions generally may be altered; and so on. As an additional, non-limiting, example, control flow to and from driver 330 from various functional modules may, in alternative embodiments, be accomplished directly between or among such functional modules without the involvement of a driver module. Numerous other embodiments, and modifications thereof, are contemplated as falling within the scope of the present invention as defined by appended claims and equivalents thereto.

What is claimed is:

1. A computer system having at least one central processing unit (CPU) and at least one memory unit having stored therein a plurality of original instructions of an executable file, the plurality of original instructions comprising a plurality of target instructions and a plurality of jump instructions, the at least one memory unit also having a set of jump-evaluating-trace-designator instructions for execution by the at least one CPU, the jump-evaluating-trace-designator instructions designating, when so executed, at least one trace in the original instructions, the at least one trace having a start instruction and an end instruction, the set of jump-evaluating-trace-designator instructions comprising
a set of start-end-designator instructions that, when executed by the at least one CPU,
(a) designates a target instruction as the start instruction upon at least one start-trace counter corresponding to the target instruction reaching a start-trace threshold, wherein the reaching of the start-trace threshold is determined by control passing to the target instruction, and
(b) designates a jump instruction as the end instruction upon at least one jump-type counter corresponding to the jump instruction reaching an end-trace threshold, wherein the reaching of the end-trace threshold is determined by control passing through the jump instruction.

2. The computer system of claim 1, further comprising an operating system, and
wherein the set of jump-evaluating-trace-designator instructions is executed by the at least one CPU in cooperation with the operating system.

3. The computer system of claim 1, wherein:
the reaching of the start-trace threshold by the at least one start-trace counter is determined by a first number of times that control has passed to the target instruction; and
the reaching of the end-trace threshold by the at least one jump-type counter is determined by a second number of times that control has passed through the jump instruction.

4. The computer system of claim 3, wherein:
the plurality of jump instructions comprises at least one type of jump instructions;
the start-trace threshold comprises at least one jump-instruction-specific start-trace threshold, each corresponding to at least one of the types of jump instructions; and
the end-trace threshold comprises one or more jump-instruction-specific end-trace thresholds, each corresponding to at least one of the one or more types of jump instructions.

5. The computer system of claim 4, wherein the jump-evaluating-trace-designator instructions further comprise:
instructions for implementing a jump instruction look-up table for storing the jump-instruction-specific start-trace thresholds and the jump-instruction-specific end-trace thresholds, and for correlating each of the types of jump instructions with one jump-instruction-specific start-trace threshold and with one jump-instruction-specific end-trace threshold.

6. The computer system of claim 4, wherein:
at least one of the jump-instruction-specific start-trace thresholds has a value that represents a threshold that can never be reached.

7. The computer system of claim 4, wherein:
at least one of the jump-instruction-specific end-trace thresholds has a value that represents a threshold that can never be reached.

8. The computer system of claim 4, wherein:
the first number is equal to or greater than at least one of the jump-instruction-specific-start-trace thresholds.

9. The computer system of claim 8, wherein:
the at least one jump-instruction-specific-start-trace threshold corresponds to the jump instruction through which control last passed to the target instruction, whereupon the target instruction is designated as the start instruction.

10. The computer system of claim 4, wherein:
the second number is equal to or greater than the jump-instruction-specific end-trace threshold corresponding to the type of jump instruction of the jump instruction through which control last passed, whereupon the jump instruction through which control last passed is designated as the end instruction.

11. The computer system of claim 4, wherein the set of jump-evaluating-trace-designator instructions further comprises:
a trace instruction counter configured to count a third number of instructions in a trace; and
a set of end-trace-detector instructions that, when executed by the at least one CPU, designate a jump instruction as the end instruction upon the trace instruction counter reaching or exceeding a corresponding jump-instruction-specific maximum end-trace threshold.

12. The computer system of claim 11, wherein:
the third number comprises at least one jump-instruction-specific maximum number, each corresponding to at least one type of jump instruction;
wherein the third number is equal to or greater than the jump-instruction-specific maximum number corresponding to the jump instruction through which control last passed, whereupon the jump instruction is designated as the maximum-trace original instruction.

13. The computer system of claim 1, wherein:
the reaching of the start-trace threshold by the at least one start-trace counter is determined by a first frequency with which control has passed to the target instruction; and
the reaching of the end-trace threshold by the at least one jump-type counter is determined by a second frequency with which control has passed through the jump instruction.

14. The computer system of claim 1, wherein:
the start-trace threshold and the end-trace threshold are predetermined.

15. The computer system of claim 1, wherein:
the start-trace threshold and the end-trace threshold are user-selectable.

16. The computer system of claim 1, wherein:
the start-trace threshold and the end-trace threshold are automatically adjustable.

17. The computer system of claim 1, wherein:
the set of jump-evaluating-trace-designator instructions further comprises:
a set of translator instructions that, when executed by the at least one CPU, translate the at least one trace to produce a plurality of translated instructions.

18. The computer system of claim 17, wherein:
the set of jump-evaluating-trace-designator instructions further comprises:
a set of dynamic-optimizer instructions that, when executed by the at least one CPU, dynamically optimize at least one of the plurality of translated instructions.

19. The computer system of claim 17, wherein:
the set of jump-evaluating-trace-designator instructions further comprises:
a set of backpatch-manager instructions that, when executed by the at least one CPU, backpatch a first translated instruction to pass control to a second translated instruction, when present; and
wherein the second translated instruction corresponds to an original instruction that is the target of the first translated instruction.

20. The computer system of claim 1, wherein:
the set of jump-evaluating-trace-designator instructions further comprises:
a set of original-instruction-processor instructions that, when executed by the at least one CPU, cooperate with the at least one CPU to assume control over execution of at least one original instruction.

21. The computer system of claim 20, wherein:
the set of jump-evaluating-trace-designator instructions further comprises:
a set of translator instructions that, when executed by the at least one CPU, translate the at least one trace to produce a plurality of translated instructions; and
a set of instruction-emulator instructions that, when executed by the at least one CPU, emulate at least one original instruction;
and wherein the set of original-instruction-processor instructions further selectively direct control to one of the group consisting of the instruction-emulator instructions, the start-end-designator instructions, and at least one translated instruction.

22. The computer system of claim 1, wherein:
the set of jump-evaluating-trace-designator instructions further comprises:
a set of instruction-emulator instructions that, when executed by the at least one CPU, emulate at least one original instruction.

23. A computer system having at least one central processing unit (CPU) and at least one memory unit having stored therein a plurality of original instructions of an executable file, the plurality of original instructions comprising a plurality of target instructions and a plurality of jump instructions, and a jump-evaluating trace designator configured to cooperate with the at least one CPU to designate at least one trace having a start instruction and an end instruction, the jump-evaluating trace designator comprising
a start-end designator configured:
(a) to designate a target instruction as the start instruction upon at least one start-trace counter corresponding to the target instruction reaching a start-trace threshold, wherein the reaching of the start-trace threshold is determined by control passing to the target instruction, and
(b) to designate a jump instruction as the end instruction upon at least one jump-type counter corresponding to the jump instruction reaching an end-trace threshold, wherein the reaching of the end-trace threshold is determined by control passing through the jump instruction.

24. The computer system of claim 23, further comprising an operating system, and
wherein the set of jump-evaluating-trace-designator instructions is executed by the at least one CPU in cooperation with the operating system.

25. The computer system of claim 23, wherein:
the reaching of the start-trace threshold by the at least one start-trace counter is determined by a first number of times that control has passed to the target instruction; and
the reaching of the end-trace threshold by the at least one jump-type counter is determined by a second number of times that control has passed through the jump instruction.

26. The computer system of claim 25, wherein:
the reaching of the start-trace threshold by the at least one start-trace counter is determined by a first frequency with which control has passed to the target instruction; and
the reaching of the end-trace threshold by the at least one jump-type counter is determined by a second number of times that control has passed through the jump instruction.

27. The computer system of claim 25, wherein:
the plurality of jump instructions comprises at least one type of jump instructions;
the start-trace threshold comprises at least one jump-instruction-specific start-trace threshold, each corresponding to at least one of the types of jump instructions; and
the end-trace threshold comprises at least one jump-instruction-specific end-trace threshold, each corresponding to at least one of the types of jump instructions.

28. The computer system of claim 27, wherein:
the first number is equal to or greater than at least one of the jump-instruction-specific-start-trace thresholds.

29. The computer system of claim 28, wherein:
the at least one jump-instruction-specific-start-trace threshold corresponds to the jump instruction through which control last passed to the target instruction, whereupon the target instruction is designated as the start instruction.

30. The computer system of claim 29, wherein:
the jump-evaluating trace designator further comprises:
a translator configured to translate the at least one trace to produce a plurality of translated instructions; and
an instruction emulator configured to emulate at least one original instruction;
and wherein the original instruction processor further is configured selectively to direct control to one of the group consisting of the instruction emulator, the start-end designator, and at least one translated instruction.

31. The computer system of claim 27, wherein:
the second number is equal to or greater than the jump-instruction-specific end-trace threshold corresponding to the type of jump instruction of the jump instruction through which control last passed, whereupon the jump instruction through which control last passed is designated as the end instruction.

32. The computer system of claim 27, wherein:
the jump-evaluating trace designator further comprises:
a dynamic optimizer configured dynamically to optimize at least one of the plurality of translated instructions.

33. The computer system of claim 27, wherein:
the jump-evaluating trace designator further comprises:
a backpatch manager configured to backpatch a first translated instruction to pass control to a second translated instruction, when present; and
wherein the second translated instruction corresponds to an original instruction that is the target of the first translated instruction.

34. The computer system of claim 23, wherein:
the start-trace threshold and the end-trace threshold are predetermined.

35. The computer system of claim 23, wherein:
the jump-evaluating trace designator further comprises:
a translator configured to translate the at least one trace to produce a plurality of translated instructions.

36. The computer system of claim 23, wherein:
the jump-evaluating trace designator further comprises:
an original instruction processor configured to cooperate with the operating system and the at least one CPU to assume control over execution of at least one original instruction.

37. The computer system of claim 23, wherein:
the jump-evaluating trace designator further comprises:
an instruction emulator configured to emulate at least one original instruction.

38. A computer-implemented method for designating from a plurality of original instructions of an executable file at least one trace having a start instruction and an end instruction, the plurality of original instructions comprising a plurality of target instructions and a plurality of jump instructions, the method comprising the steps of:
(a) designating a target instruction as the start instruction upon at least one start-trace counter corresponding to the target instruction reaching a start-trace threshold, wherein the reaching of the start-trace threshold is determined by control passing to the target instruction; and
(b) designating a jump instruction as the end instruction upon at least one jump-type counter corresponding to the jump instruction reaching an end-trace threshold, wherein the reaching of the end-trace threshold is determined by control passing through the jump instruction.

39. The method of claim 38, wherein:
the reaching of the start-trace threshold by the at least one start-trace counter is determined by a first number of times that control has passed to the target instruction; and
the reaching of the end-trace threshold by the at least one jump-type counter is determined by a second number of times that control has passed through the jump instruction.

40. The method of claim 39, wherein:
the plurality of jump instructions comprises at least one type of jump instructions;
the start-trace threshold comprises at least one jump-instruction-specific start-trace threshold, each corresponding to at least one of the types of jump instructions; and
the end-trace threshold comprises at least one jump-instruction-specific end-trace threshold, each corresponding to at least one of the types of jump instructions.

41. The method of claim 40, further comprising the step of:
(c) designating the target instruction as the start instruction upon the first number being equal to or greater than at least one of the jump-instruction-specific-start-trace thresholds.

42. The method of claim 41, wherein:
the at least one jump-instruction-specific-start-trace threshold corresponds to the jump instruction through which control last passed to the target instruction, whereupon the target instruction is designated as the start instruction.

43. The method of claim 40, further comprising the step of:
(c) upon the second number being equal to or greater than the jump-instruction-specific end-trace threshold corresponding to the type of jump instruction of the jump instruction through which control last passed, designating the jump instruction through which control last passed as the end instruction.

44. The method of claim 38, further comprising the step of:
(c) translating the at least one trace to produce a plurality of translated instructions.

45. The method of claim 44, further comprising the step of:
(d) dynamically optimizing at least one of the plurality of translated instructions.

46. Storage media that contains software that, when executed on an appropriate computing system having at least one central processing unit (CPU) and at least one memory unit having stored therein a plurality of original instructions of an executable file, the plurality of original instructions comprising a plurality of target instructions and a plurality of jump instructions, performs a method comprising the steps of:
(a) designating a target instruction as a start of a trace upon at least one start-trace counter corresponding to the target instruction reaching a start-trace threshold, wherein the reaching of the start-trace threshold is determined by control passing to the target instruction; and
(b) designating a jump instruction as an end of the trace upon at least one jump-type counter corresponding to the jump instruction reaching an end-trace threshold, wherein the reaching of the end-trace threshold is determined by control passing through the jump instruction.

47. The storage media of claim 46, wherein:
the plurality of jump instructions comprises at least one type of jump instructions;
the start-trace threshold comprises at least one jump-instruction-specific start-trace threshold, each corresponding to at least one of the types of jump instructions; and
the end-trace threshold comprises at least one jump-instruction-specific end-trace thresholds, each corresponding to at least one of the one or more types of jump instructions.

48. The storage media of claim 46, wherein the method further comprises the steps of:
(c) translating the at least one trace to produce a plurality of translated instructions; and
(d) dynamically optimizing at least one of the plurality of translated instructions.

49. A computer program product for use with an appropriate computing system having at least one central processing unit (CPU) and at least one memory unit having stored therein a plurality of original instructions of an executable file, the plurality of original instructions comprising a plurality of target instructions and a plurality of jump instructions, the computer program product comprising:

a computer usable medium having embodied therein computer readable program code method steps, the method steps comprising:

(a) designating a target instruction as a start of a trace upon at least one start-trace counter corresponding to the target instruction reaching a start-trace threshold, wherein the reaching of the start-trace threshold is determined by control passing to the target instruction; and (b) designating a jump instruction as an end of the trace upon at least one jump-type counter corresponding to the jump instruction reaching an end-trace threshold, wherein the reaching of the end-trace threshold is determined by control passing through the jump instruction.

50. The computer program product of claim 49, wherein the method steps further comprise:

(c) translating the at least one trace to produce a plurality of translated instructions; and (d) dynamically optimizing at least one of the plurality of translated instructions.

* * * * *